(12) United States Patent
Brennan et al.

(10) Patent No.: US 7,676,747 B2
(45) Date of Patent: Mar. 9, 2010

(54) METHOD FOR REPRESENTING SECURITY FEATURES OF A DISTRIBUTED SYSTEM

(75) Inventors: Jay Brennan, Reston, VA (US); Donald B. Faatz, Sterling, VA (US); Mindy E. Rudell, Arlington, VA (US)

(73) Assignee: The Mitre Corporation, McLean, VA (US)

(*) Notice: Subject to any disclaimer, the term of this patent is extended or adjusted under 35 U.S.C. 154(b) by 1120 days.

(21) Appl. No.: 11/174,600

(22) Filed: Jul. 6, 2005

(65) Prior Publication Data
US 2007/0011460 A1 Jan. 11, 2007

(51) Int. Cl.
G06F 19/00 (2006.01)
(52) U.S. Cl. .................. 715/734; 709/223; 717/104
(58) Field of Classification Search ............... 703/13; 715/734
See application file for complete search history.

(56) References Cited

U.S. PATENT DOCUMENTS

| | | | | |
|---|---|---|---|---|
| 5,720,023 | A * | 2/1998 | Putland et al. | 345/440 |
| 5,838,973 | A * | 11/1998 | Carpenter-Smith et al. | 717/105 |
| 5,987,242 | A * | 11/1999 | Bentley et al. | 703/13 |
| 6,064,382 | A * | 5/2000 | Diedrich et al. | 715/700 |
| 6,182,274 | B1 * | 1/2001 | Lau | 717/104 |
| 7,003,562 | B2 * | 2/2006 | Mayer | 709/223 |
| 7,315,801 | B1 * | 1/2008 | Dowd et al. | 703/13 |
| 7,406,045 | B2 * | 7/2008 | Couturier | 370/231 |
| 2003/0101251 | A1 * | 5/2003 | Low | 709/223 |
| 2003/0191797 | A1 * | 10/2003 | Gurevich et al. | 709/200 |
| 2004/0153536 | A1 * | 8/2004 | Strassner | 709/223 |
| 2005/0251853 | A1 * | 11/2005 | Bhargavan et al. | 726/1 |
| 2005/0261884 | A1 * | 11/2005 | Sakamoto et al. | 703/13 |

OTHER PUBLICATIONS

Nathan Debardeleben, "Coven Developer Guidelines", Jan. 28, 2003, 20 pages.*
Nathan Debardeleben, "Coven Module Writer's Guide", Feb. 13, 2003, 16 pages.*
Nathan DeBardeleben, "Coven Program Writer's Guide", Mar. 9, 2003, 12 pages.*
DeBardeleben et al, "CERSe—a Tool for High Performanace Remote Sensing Application Development", 2002, 6 pages.*

(Continued)

Primary Examiner—Ponnoreay Pich
(74) Attorney, Agent, or Firm—Sterne, Kessler, Goldstein & Fox P.L.L.C.

(57) ABSTRACT

A method for representing security features of a distributed system is presented. The method includes creating abstractions to describe security mechanisms of a system, and creating a specification using the abstractions. The specification models components of the security mechanisms, features of an environment in which the system operates, and supporting security features. The method may further include linking the specification to graphical representations, and using the specification to construct an instance diagram that graphically depicts the security features of the system and its operational environment. The specification or the instance diagram may be used to construct an instance model, which may be a textual rendering, that models the security features of the system and its operational environment. Where the specification is used to construct the instance model, the method may further include using the instance model to construct the instance diagram.

19 Claims, 27 Drawing Sheets

OTHER PUBLICATIONS

DeBardeleben et al, "Coven—a Framework for High Performanace Problem Solving Environments", 2002, 8 pages.*

Shirley, RFC 2828 Internet Security Glossary, May 2000.

Georgiev, I.K., and Georgiev, I.I., "A Security Model for Distributed Computing," *Journal of Computing in Small Colleges*, 17:178-186, Consortium for Computing in Small Colleges (2001).

Loddenstedt, T., et al., "SecureUML: A UML-Based Modeling Language for Model-Driven Security," $5^{th}$ *Int'l. Conf. on the Unified Language Modeling Language, LNCS 2460*: 426-441, Springer-Verlag Berlin Heidelberg (2002).

Nelson, R., "Integrating Formalism and Pragmatism: Architectural Security," *Proceedings of the 1997 Workshop on New Security Paradigms*, pp. 1-4, Association for Computing Machinery, Inc. (1998).

* cited by examiner

R3: Segment End Entity

R2: Application Service

R1: Actor

CR 1: Application Cluster

R6: Non-Persistent Storage

R8: Shadow Directory

R5: Shadow Database

R7: Directory

R4: Database

FIG. 10B R13: Directed Segment
FIG. 10A R12: Bi-Directional Segment (default)

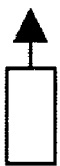
FIG. 12A R20: Start Bitbucket
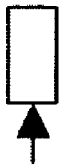
FIG. 12B R21: End Bitbucket
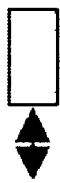
FIG. 12C R22: Two Way Bitbucket

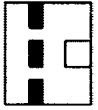
R23: Organization
FIG. 15A
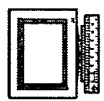
R24: Large Computer
FIG. 15B
R25: Workstation
FIG. 15C
R26: Computing Center
FIG. 15D
R27: Generic Building
FIG. 15E
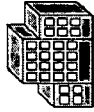
R28: Physical Security
FIG. 15F
R29: Zone Access
FIG. 15G

R39: Authentication Decision Point

R40: Access Control Decision Point

R41: Audit Decision Point

R42: Access Control Enforcement Point

R43

R39

R40

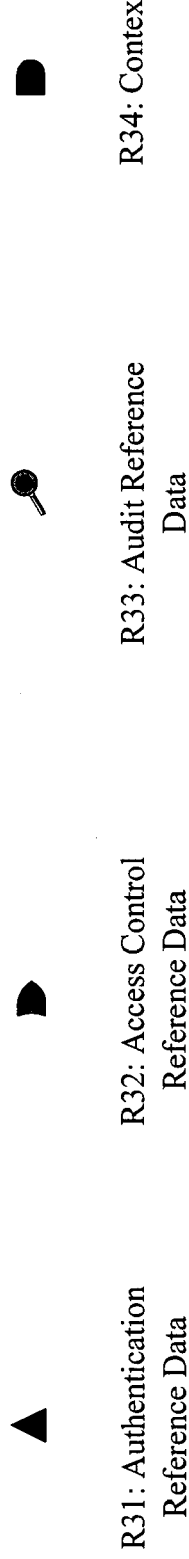
R31: Authentication Reference Data
FIG. 18A
R32: Access Control Reference Data
FIG. 18B
R33: Audit Reference Data
FIG. 18C
R34: Context
FIG. 18D
R35: Authentication Reference Extract
FIG. 18E
R36: Access Control Reference Extract
FIG. 18F
R37: Audit Reference Extract
FIG. 18G
R38: Context Extract
FIG. 18H $\mathcal{H}(\mathcal{P}, \mathcal{N})$

R48

R47

$\mathcal{P}, 1234 \longrightarrow A$

R46

METHOD FOR REPRESENTING SECURITY FEATURES OF A DISTRIBUTED SYSTEM

STATEMENT REGARDING FEDERALLY SPONSORED RESEARCH AND DEVELOPMENT

Part of the work performed during development of this invention utilized U.S. Government finds. The U.S. Government has certain rights in this invention. The U.S. government has a paid-up license in this invention and the right in limited circumstances to require the patent owner to license others on reasonable terms as provided for by the terms of Contract No. TIRN0-99-D-000005, task under number 0077, project 19023180-08, awarded by IRS Office of Modernization Security.

BACKGROUND OF THE INVENTION

1. Field of the Invention

The present invention relates generally to modeling methods, and in particular, to a method for representing security features of a distributed system.

2. Background Art

Organizations are delivering an increasing number of services over the Internet or internal versions thereof. For many, the situation is further complicated as they adopt new information technologies such as directories, which themselves might be important components of a security design. These services can now be distributed across multiple networks or geographical locations, and be deployed within multi-tier configurations. It is also not unusual to find different security policies in effect depending on the location or responsible owner of a service. Many organizations must adapt to new methods of delivery, to an accompanying increased complexity in their systems and system designs, and to new classes of threats that follow from allowing wider and different styles of access to the organization's data and services. In such environments, having tight, clear descriptions of both system and security designs is invaluable. Yet, system-level security is remarkably resistant to being described piecemeal; the security of each piece is dependent on the security of many others. As such, it is difficult to develop a clear understanding of the security position of a system without the aid of diagrams which show its high-level security architecture. Visual representations can depict where security mechanisms are positioned, how security mechanisms relate to the system design, and how security requirements are met. A diagram of a system's security position would improve communications, not only between security engineers and architects and their systems engineering counterparts, but also with others who have a vested interest in a system's security.

The ability to convey the essence of a security design visually, while following some formalism for constructing its visual representation, is not available. Even where security features are pictured, for instance in a network diagram, the features themselves usually give only vague hints as to the actual security posture in place. There is no existing work that attempts to build models or diagrams depicting security features using a formalized or repeatable method.

What is needed, therefore, is a method for representing security features of a distributed system that provides a model builder with the ability to convey a large amount of security-relevant information, while at the same time melting away much of the detail that would obscure the diagram's readability, and thus its impact. The present invention satisfies these and other needs, and provides further related advantages, as will be made apparent by the description of the present invention that follows.

BRIEF SUMMARY OF THE INVENTION

The present invention includes a method for representing security features of a distributed system. The method includes the steps of creating abstractions to describe security mechanisms of a system, and creating a specification, using the abstractions, wherein the specification is used to model: components of the security mechanisms, features of an environment in which the system operates, and supporting security features. The method may further include the steps of linking the specification to graphical representations, and using the specification to construct an instance diagram that depicts the security features of the system and of the environment in which the system operates, wherein the instance diagram is a graphical rendering using the graphical representations. In one embodiment, the security mechanisms may comprise at least one of access control, authentication, and auditing. The method may further include either the step of using the specification or the step of using the instance diagram to construct an instance model that models the security features of the system and of the environment in which the system operates. In either embodiment, the instance model may be a textual rendering. Alternatively, where the specification is used to construct the instance model, the method may further include using the instance model to construct the instance diagram.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. In the drawings, like reference numbers, letters, or renderings indicate identical or functionally similar elements.

FIGS. 10A-10B illustrate graphical representations for bi-directional and directed segments, respectively.

FIGS. 12A-12C illustrate graphical representations for start, end and two way bitbuckets, respectively.

Figure 13:
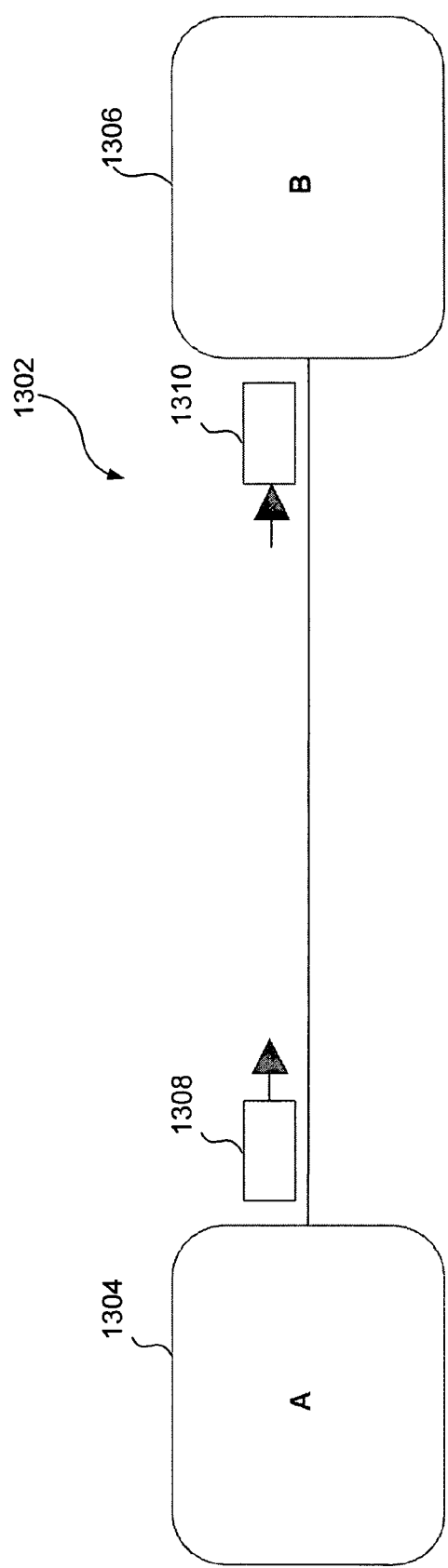

FIG. 13 an instance diagram depicting a uni-directional channel with start and end bitbuckets.

Figure 14:
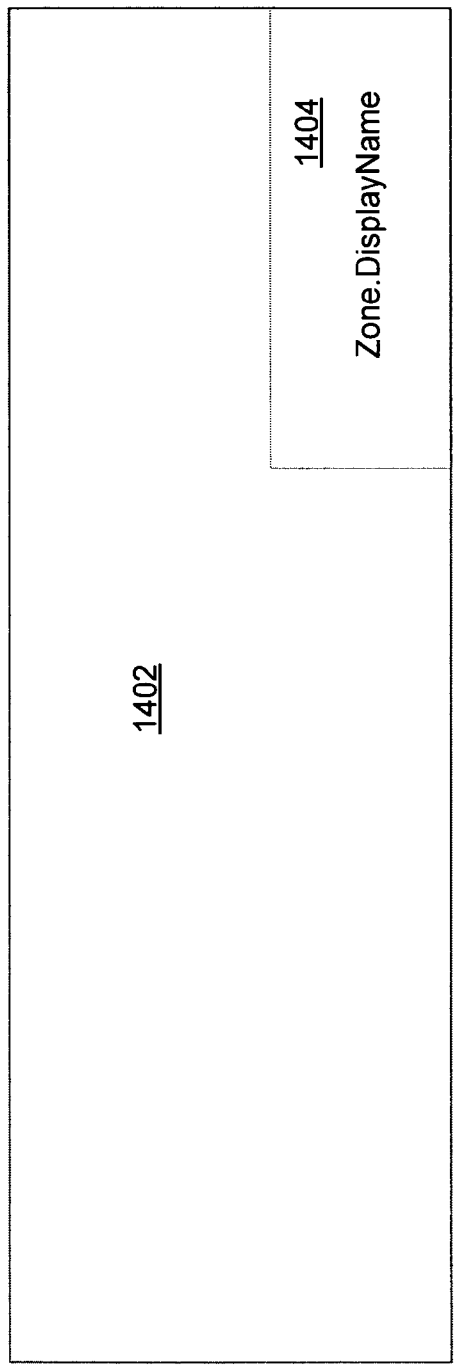

FIG. 14 illustrates a graphical representation for a zone.

FIGS. 15A-15E illustrate graphical representations for zone types.

FIGS. 15F-15G illustrate graphical representations for zone properties.

Figure 16A:
Figure 16B:
Figure 16C:

FIGS. 16A-16C illustrate graphical representations for decision points.

Figure 16D:

FIG. 16D illustrates a graphical representation for an enforcement point.

Figure 16E:
Figure 16F:
Figure 16G:

FIGS. 16E-16G illustrate graphical representations for an audit record and authentication and access control decision points.

Figure 17B:
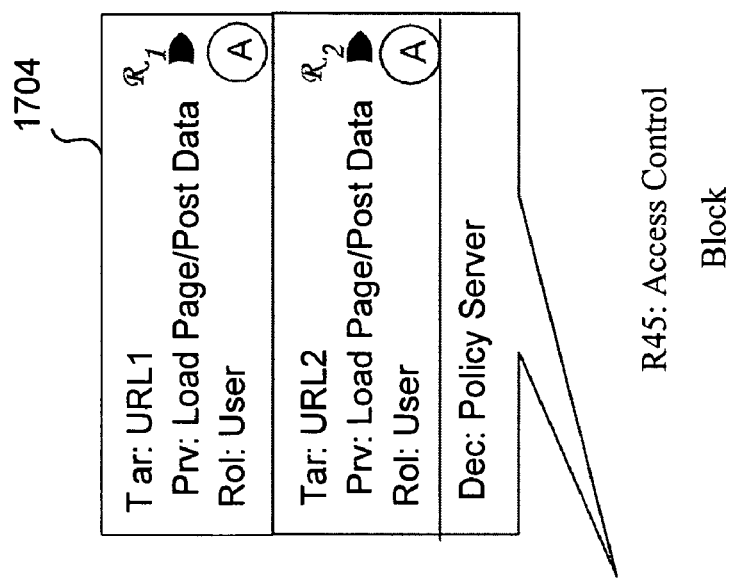
Figure 17A:
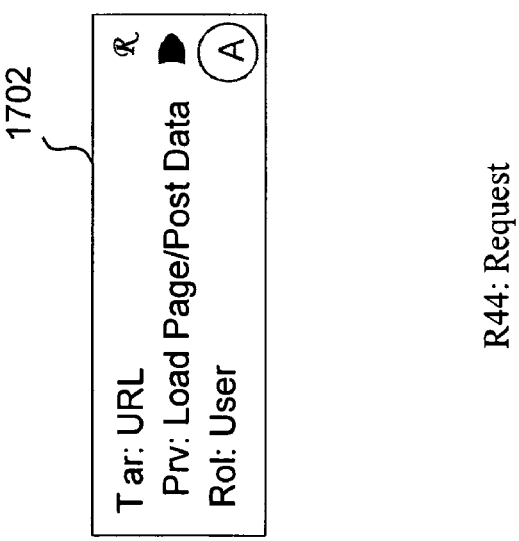

FIGS. 17A-17B illustrate graphical representations for a request and an access control block, respectively.

FIGS. 18A-18H illustrates graphical representations for security relevant information.

Figures 19A, 19B, 19C:

FIGS. 19A-19C illustrate graphical representations for a dependency relation, collection, and transformation, respectively.

Figure 20:
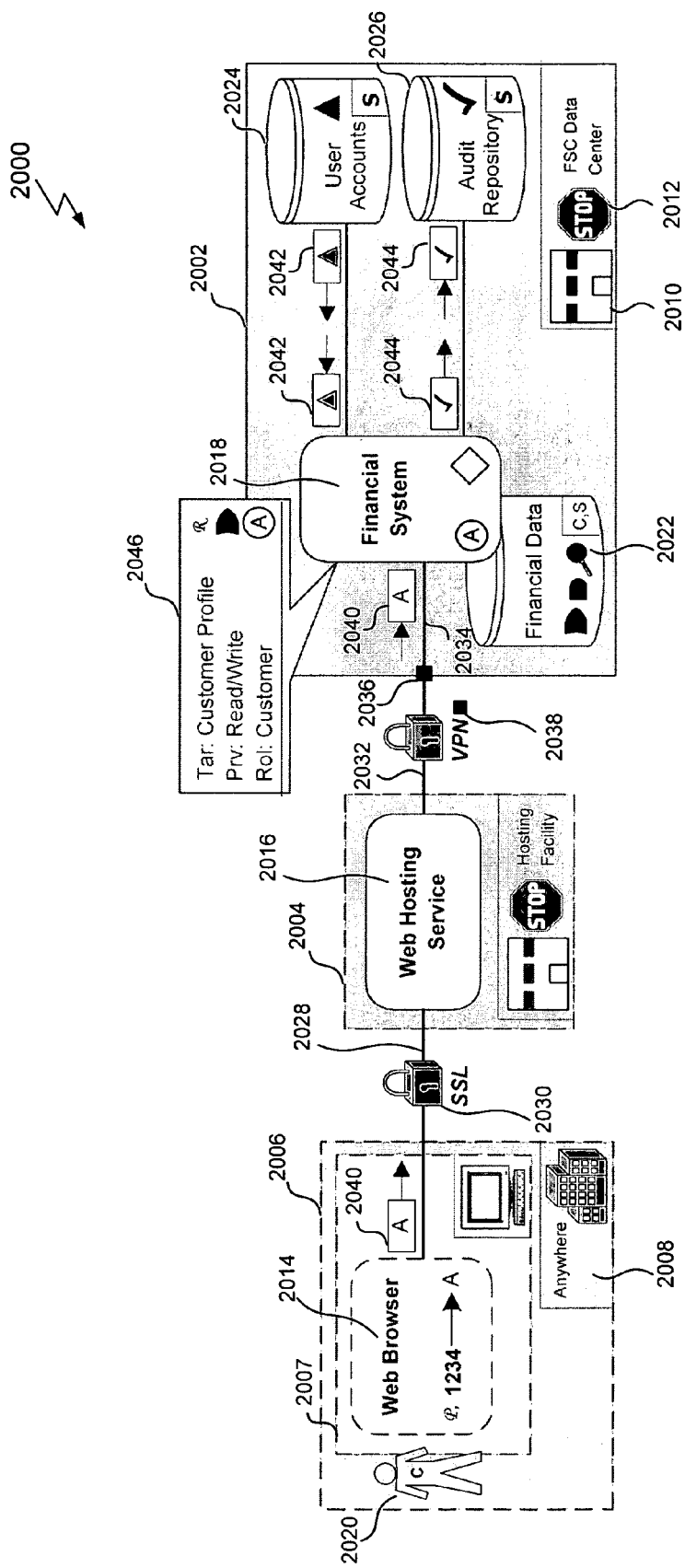

FIG. 20 is an instance diagram depicting security features of web-based access to financial information from the viewpoint of a financial services company.

Figure 21:
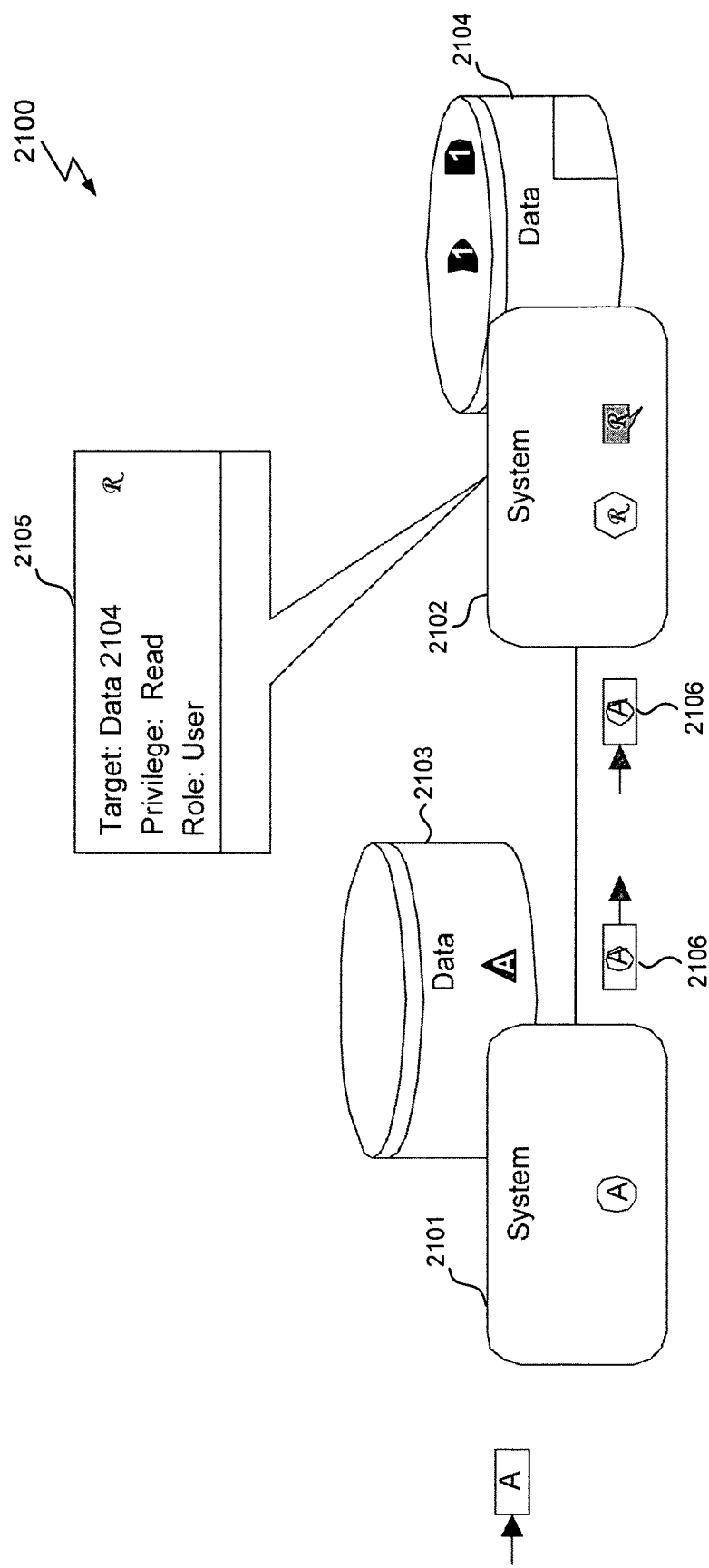

FIG. 21 is an instance diagram depicting an access control scenario.

Figure 22:
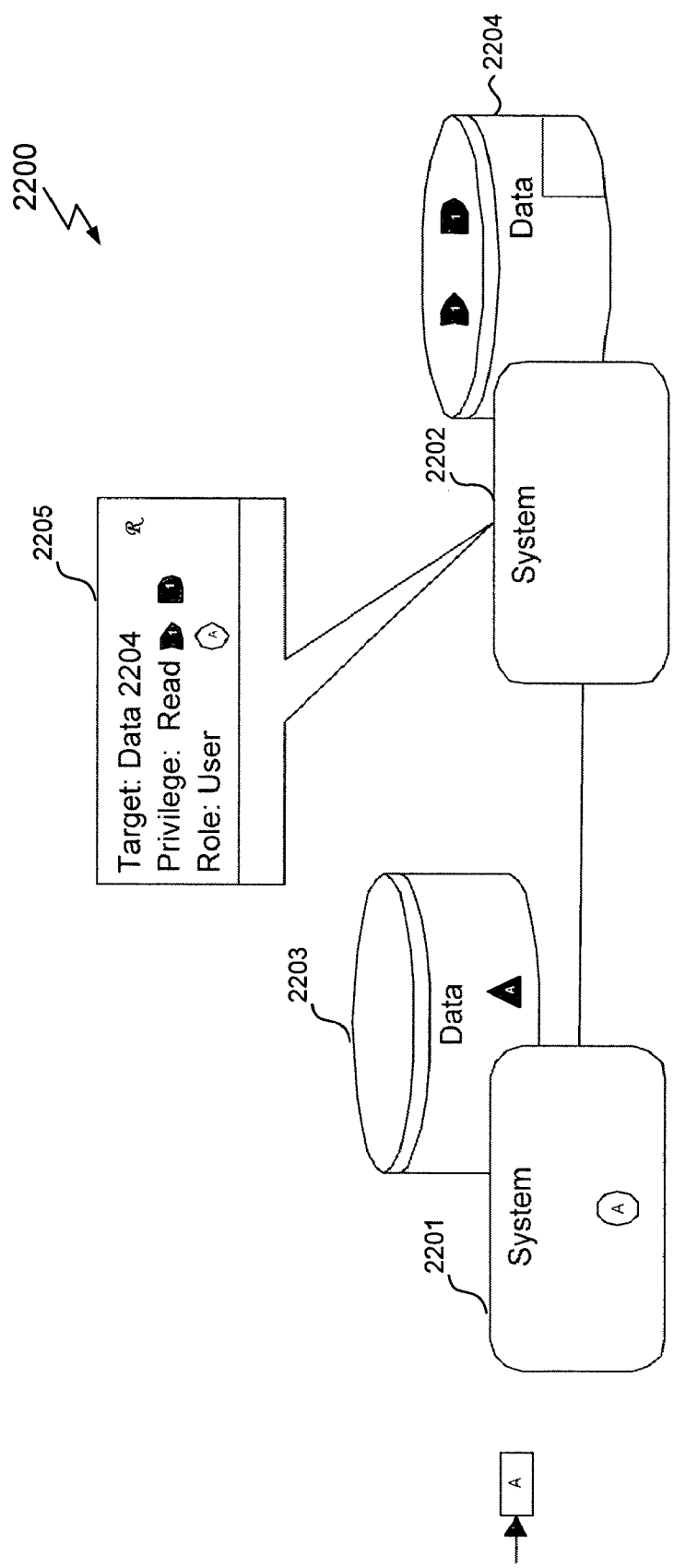

FIG. 22 is an alternative instance diagram depicting the access control scenario shown in FIG. 21.

Figure 23:
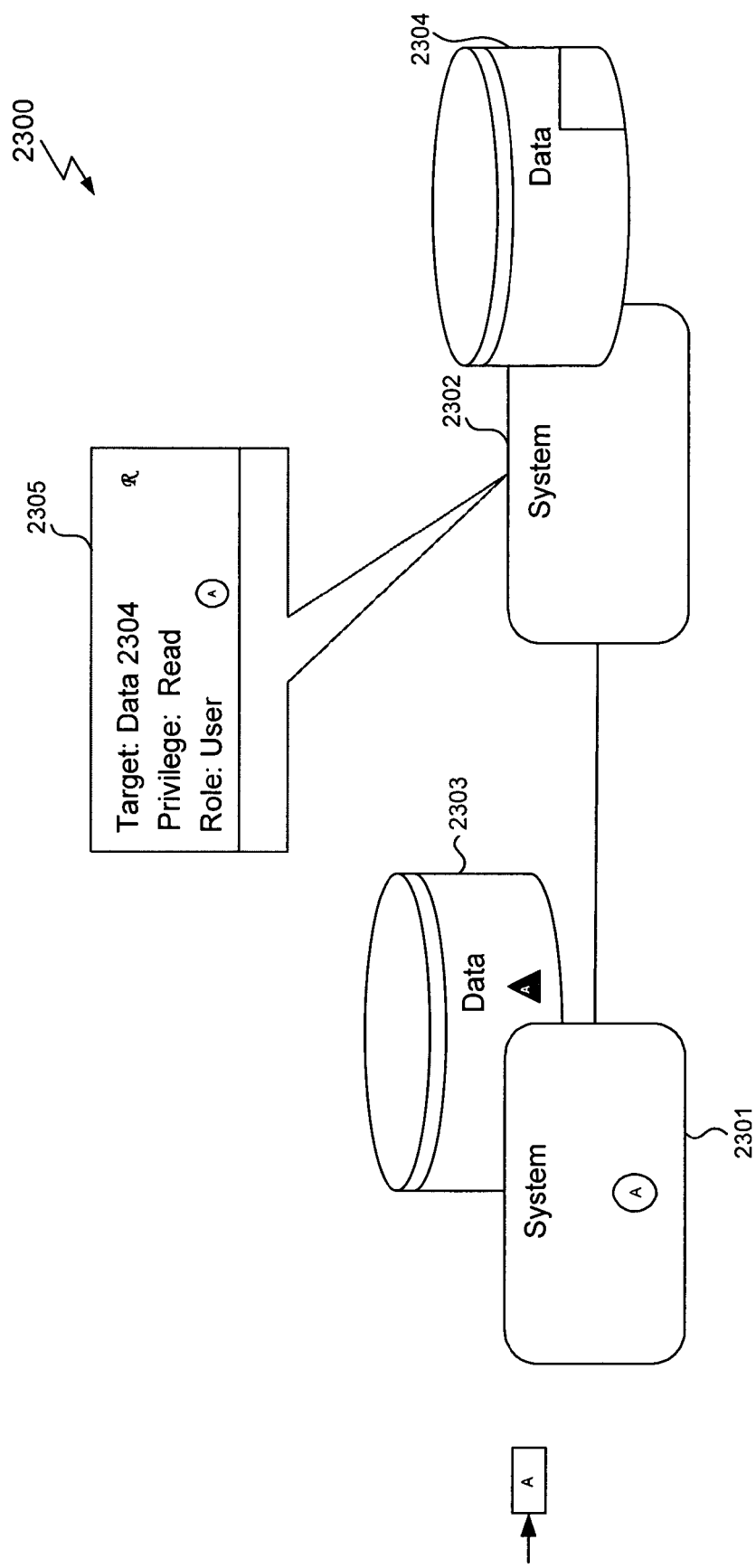

FIG. 23 is an alternative instance diagram depicting the access control scenario shown in FIGS. 21 and 22.

Figure 24:
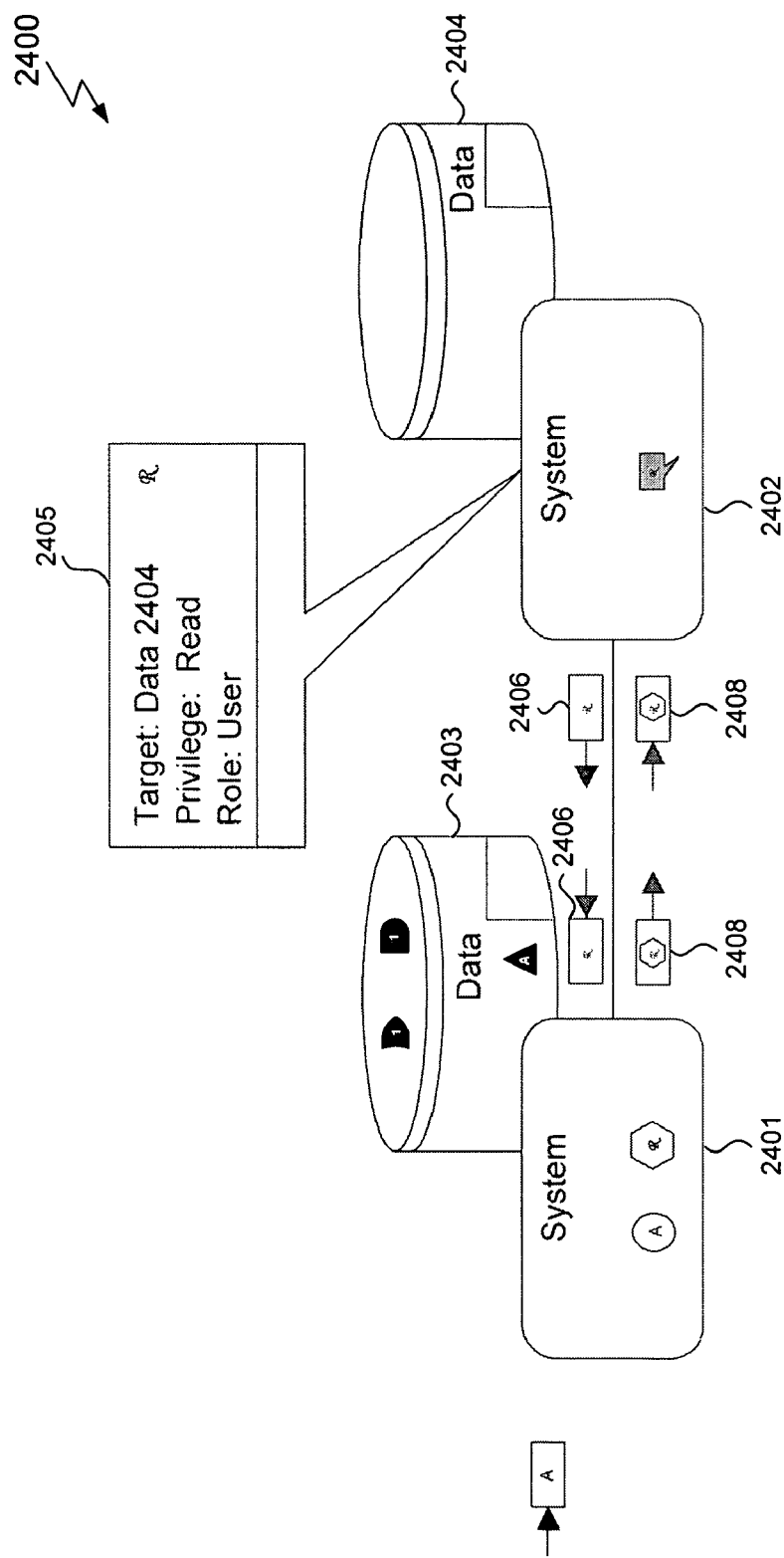

FIG. 24 is an instance diagram depicting another access control scenario.

Figure 25:
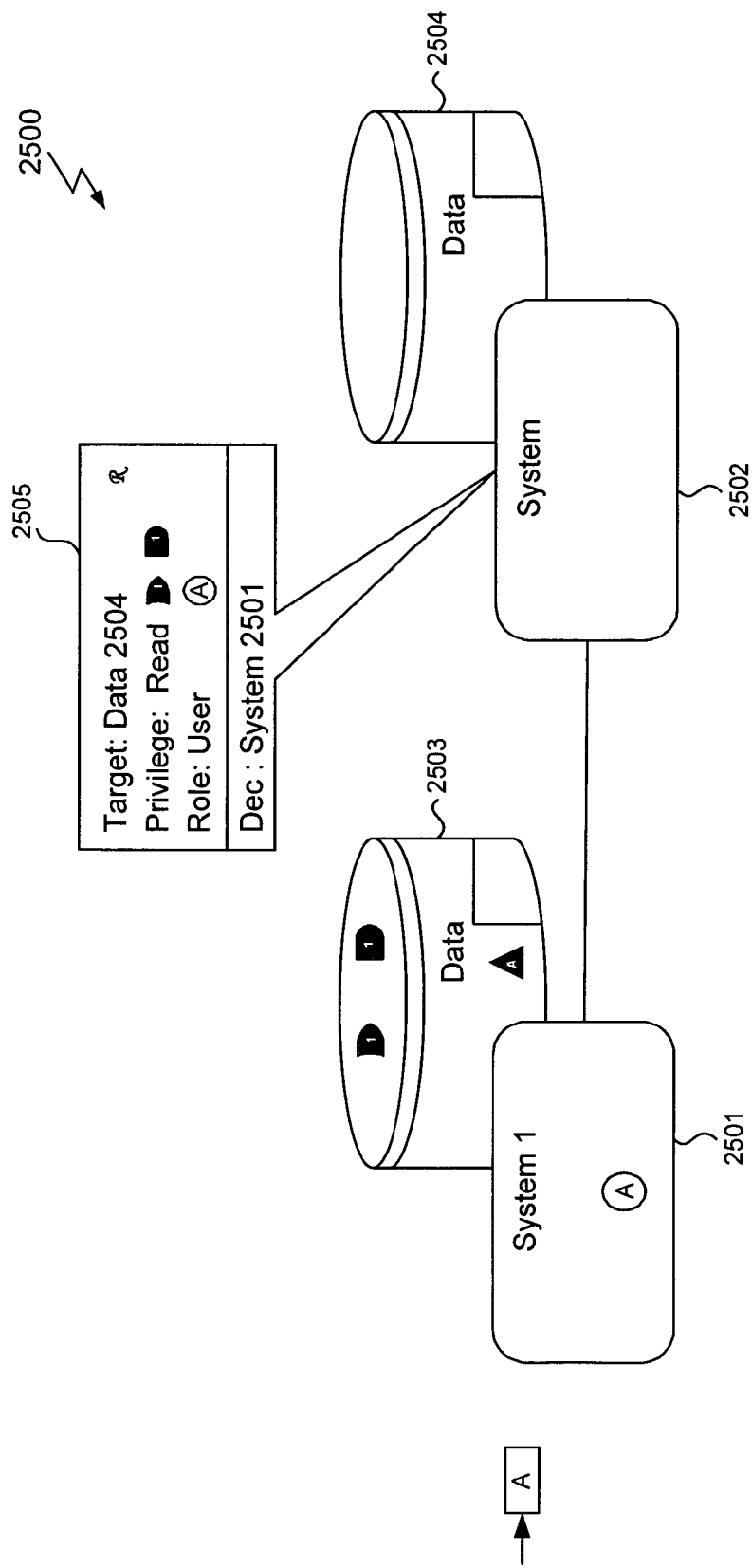

FIG. 25 is an alternative instance diagram depicting the access control scenario shown in FIG. 24.

Figure 1:
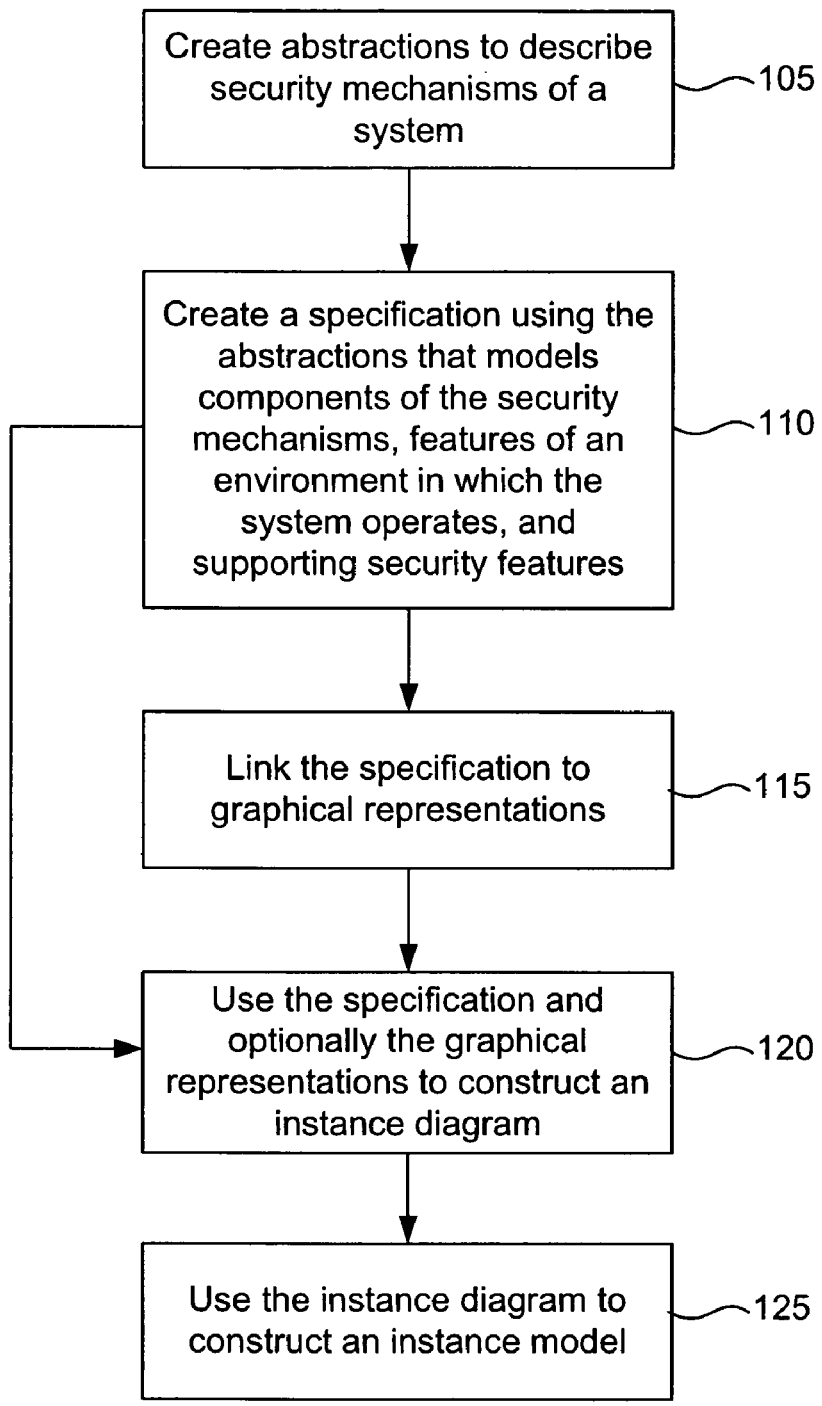
FIG. 1 is a flowchart illustrating steps performed in one embodiment of a method according to the present invention.
Figure 2:
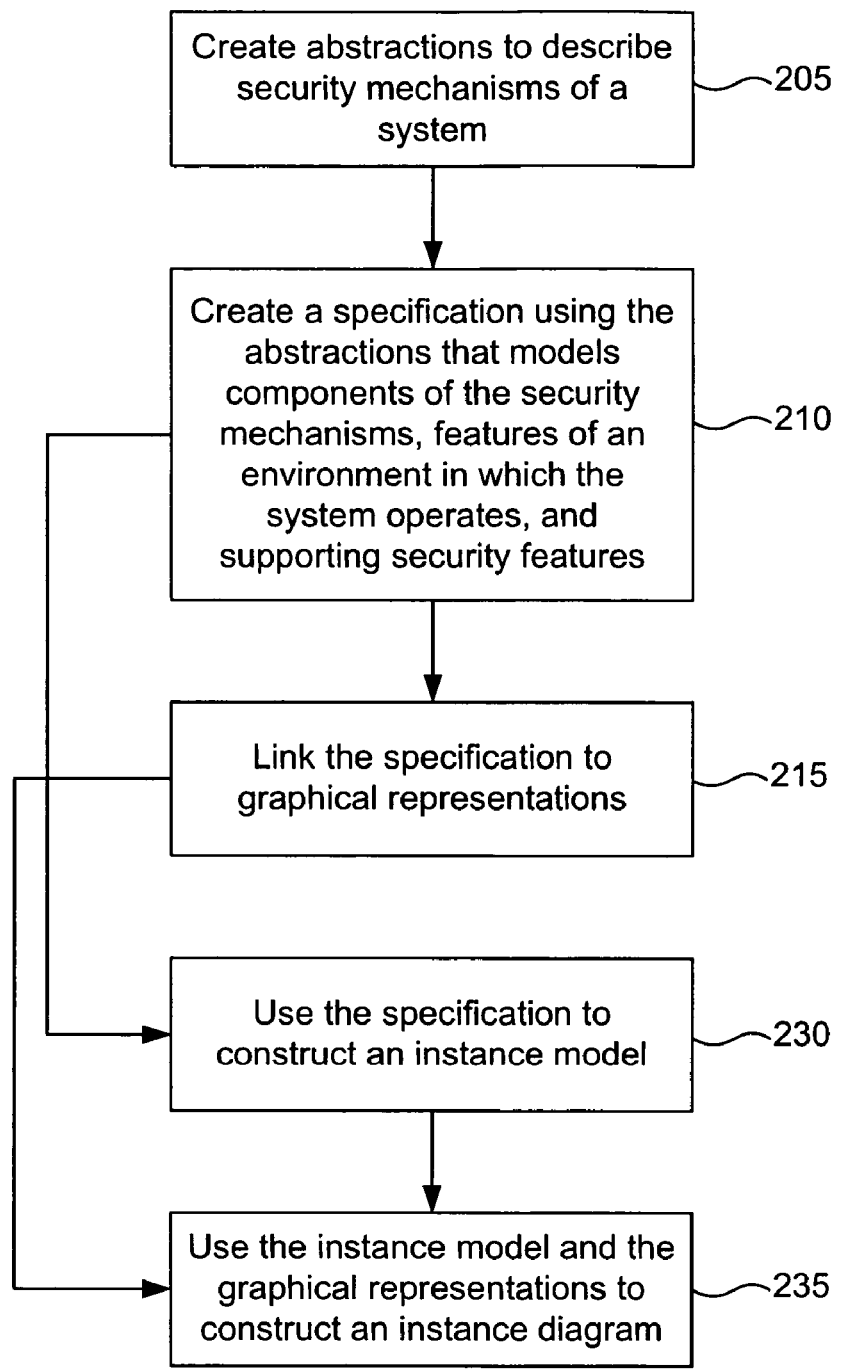
FIG. 2 is a flowchart illustrating steps performed in another embodiment of the method according to the present invention.
Figure 26:
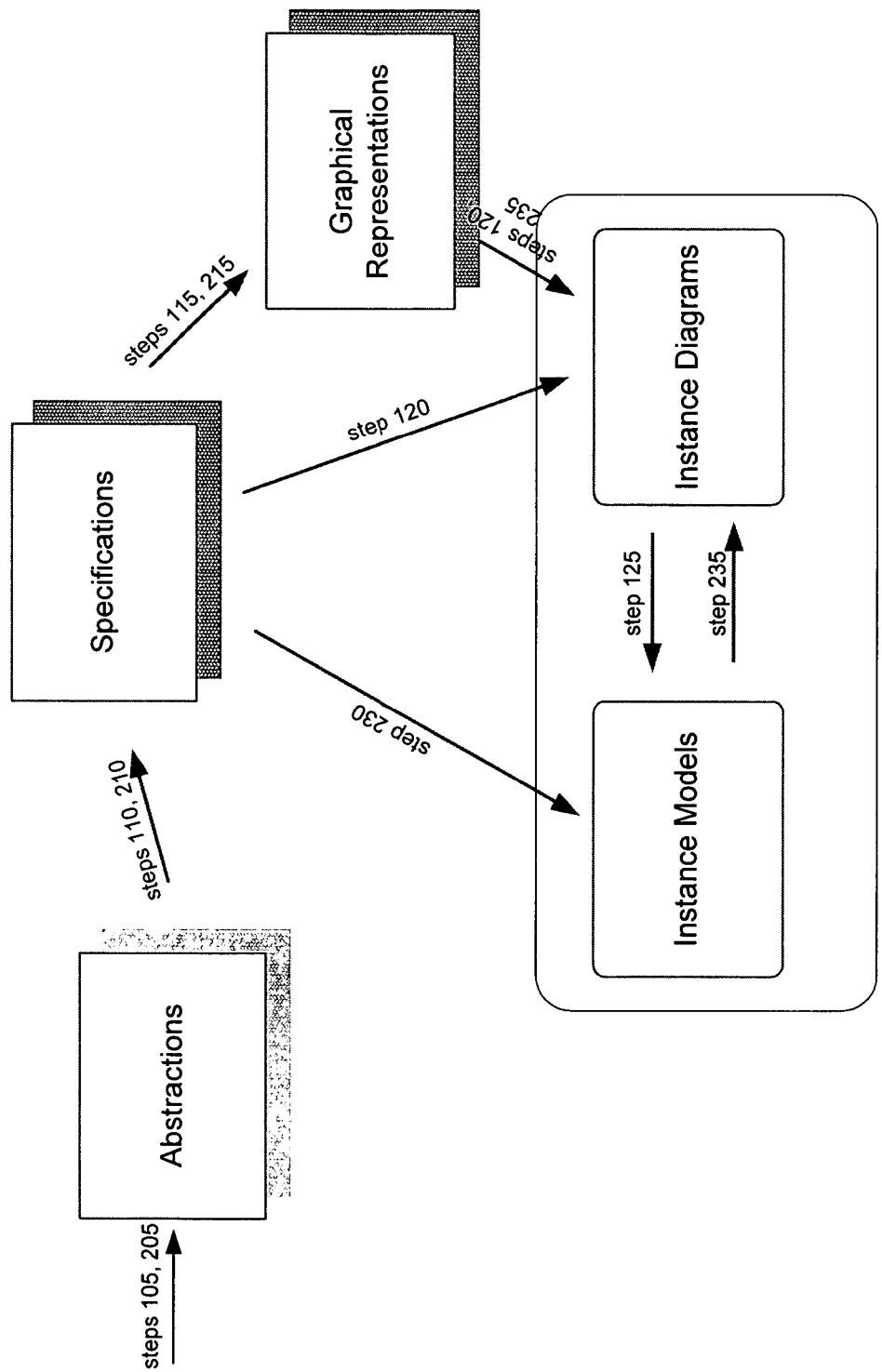

FIG. 26 is a block diagram illustrating the flowcharts of FIGS. 1 and 2.

Figure 27:
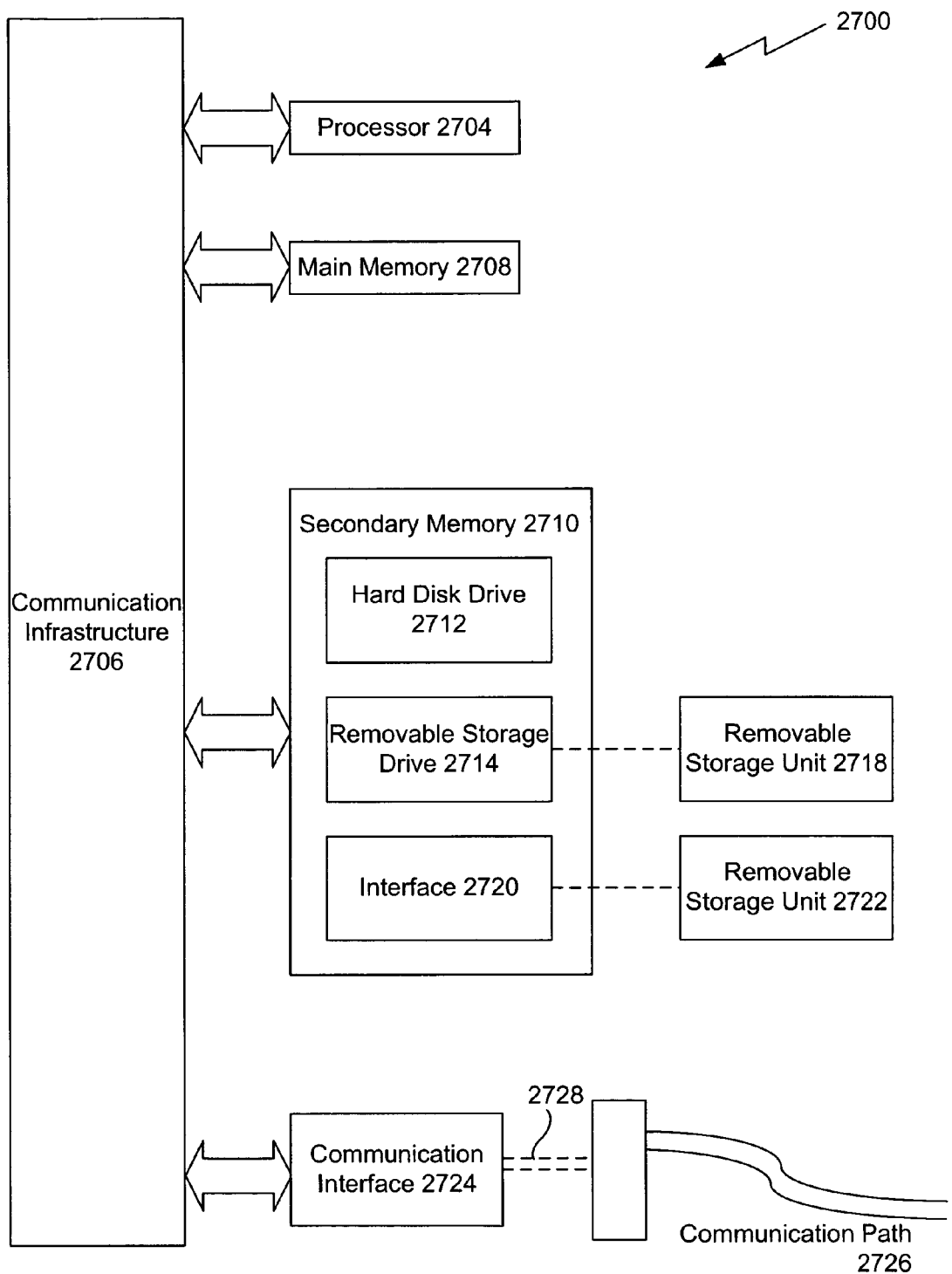

FIG. 27 is a block diagram showing an example computer system in which the present invention may be implemented as programmable code.

DETAILED DESCRIPTION OF THE INVENTION

This application uses the Internet Security Glossary, i.e., R. Shirley, RFC 2828 Internet Security Glossary, May 2000, as the source for definitions of the security terminology used and is incorporated herein by reference in its entirety. Notwithstanding the above, in this application, the term "system entity" does not refer to storage components despite the Internet Security Glossary's definition of a "system entity" as: "an active element of a system—e.g., an automated process, a subsystem, a person or group of persons—that incorporates a specific set of capabilities." Therefore, "system entity," as used herein, is an active element of a system, excluding storage components.

FIGS. 1 and 2 show high-level flowcharts providing steps for representing security features of a distributed system summarizing several embodiments of the present invention. It should be understood that these steps assist security architects to describe the security features of systems and leaves to them the choice of whether to use the method to represent what exists or what should exist. Beginning with step 105 in the flowchart illustrated in FIG. 1, abstractions are created to describe security mechanisms of a system. Generally, the security mechanisms include technical controls or processes whereby system components make decisions about who or what will be granted access to system resources, and may include coordinated applications responsible for creating a record of the results of those decisions and the circumstances under which decisions are made. In one embodiment, the security mechanisms include at least one of access control, authentication, and auditing, which are described in greater detail below.

In step 110 of FIG. 1, the abstractions are used to create a specification that models components of the security mechanism, features of an environment in which the system operates, and supporting security features. Among the features that carry useful security information and lend themselves to abstract representation are: a) the important system elements and the connections between them; b) the position of security mechanisms, in particular the places or services making security-related decisions; c) the strength of mechanisms; and, d) the security-relevant information flows between system elements. Accordingly, the specification includes definitions and rules of construction governing individual components and features of the system and its environment and guides the constructions of instance diagrams and instance models, which are further described below. The specification provides a formalism which allows instance diagrams and instance models to be constructed with unambiguous and consistent meanings, and which may compliment other design documentation and security-related information from other sources.

In another embodiment, step 115 and step 120 may be included. In step 115, the components and features defined in the specification are linked to graphical representations. The graphical representations, as well as the tool used to construct them, are independent of the specification in that their visual construction, e.g., style and shape, can be changed without changing the specification itself. Notwithstanding, the graphical representations should conform to the needs of the specification. For example, the graphical representations should allow depiction of one component contained in another component where such representation is necessary.

In step 120, the specification and the graphical representations are used to construct an instance diagram. An instance diagram is a graphical or visual rendering using the graphical representations and depicts security features of the system and of the environment in which the system operates. A model builder may employ any number of tools known in the art for building diagrams. For example, the instance diagram shown in FIG. 22 was built using the VISIO® software product, available from Microsoft. Guided by the specification, a model builder is free to include in a diagram as much as the specification allows or as little as the model builder desires, and is not bound to adhere to layout or other graphical requirements. The model builder may provide most of the layout information in a diagram. Further, the specification does not force the model builder to adopt a prevailing viewpoint, such as that of a network, operating system, or application, when depicting security features, but rather allows security features to be depicted across different frames of reference, as they may appear in practice. For example, FIG. 20 is an instance diagram depicting security features of web-based access to financial information from the viewpoint of a financial services company.

The method illustrated in FIG. 1 can, but need not, include step 125. In step 125, the detail of the instance diagram is used to build all or part of an instance model, which is a textual rendering, as distinguished from the graphical rendering of the instance diagram, that models the security features of the system of the environment in which the system operates. Instance models may be computer readable text, allowing formal analysis and design of a system's security posture to be computer-aided.

Another method for representing security features of a distributed system is illustrated in FIG. 2 and begins with step 205. Steps 205, 210 and 215 are identical to steps 105, 110, and 115 of FIG. 1. In step 230, the specification is used to construct an instance model directly, which is distinguishable from step 125 of FIG. 1 wherein an instance diagram is used to construct the instance model. The method illustrated in FIG. 2 can, but need not, include step 235. In step 235, the instance model from step 230 and the graphical representations from step 215 are used to construct an instance diagram.

A block diagram illustrating the variations discussed above with respect to FIGS. 1 and 2 is provided as FIG. 26.

Further description regarding the above embodiments will now be provided.

Security Mechanisms

Figure 3:
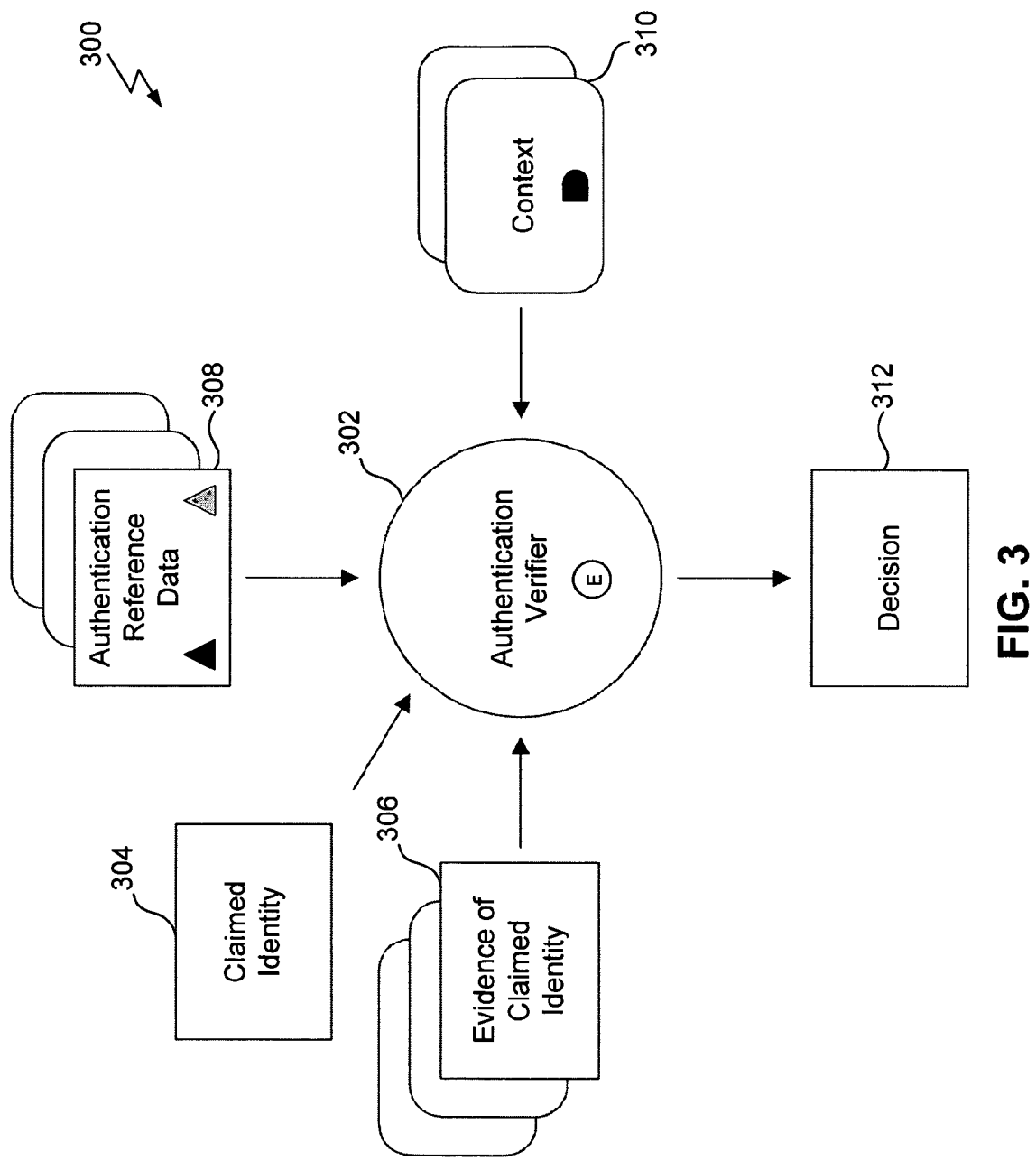
FIG. 3 is a block diagram showing an authentication security mechanism.

As described above, abstractions are created to describe security mechanisms of a system. Abstractions of security mechanisms provide a foundation for creating the specification that models components of these mechanisms along with the features of the system environment and supporting security features. Security mechanisms include, but are not limited to, the decision processes and coordinated applications of authentication, access control, and auditing. Authentication is defined as the process of verifying an identity claimed by or for a system entity. FIG. 3 shows an authentication abstraction 300 consistent with this definition. Central to authentication is an authentication verifier 302 which accepts various inputs to make an authentication decision 312. Such inputs in this embodiment include inputs of a claimed identity 304, evidence of the claimed identity 306, authentication reference data 308 and context 310. The inputs and outputs to and from the verifier 302 appear in boxes; squared corners indicate a required item; rounded corners indicate an optional one. Stacked boxes mean that the verifier can accept more than one input of the type shown. FIG. 3 also contains small symbols in the Authentication Verifier 302, Authentication Reference Data 308, and Context 310 boxes. The symbols are included in this and other figures of security mechanism abstractions so one can tie graphical representations of an instance diagram of a security system, explained more fully later, to the components of the security mechanisms presented here.

At a minimum, an authentication decision requires a claimed identity, evidence of a claimed identity, and some reference data on which to base a decision. Verifiers can accept more than one piece of evidence to a claim or consult more than one reference. Authentication Verifiers also allow system state information to play a role, and the term "Context" represents this system state information. The term "Authentication Verifier" as used here is slightly more expansive than is common since the Authentication Verifier describes decisions made using state information in addition to the information needed to simply verify an identity.

To demonstrate how the abstraction in FIG. 3 matches a common authentication decision scenario, consider password use. With password authentication, a user sends his or her identity along with a password (evidence of claimed identity) to an authentication verifier, normally part of an application or operating system. The verifier uses the claimed identity to locate its version of that identity's password (authentication reference data), which it compares to the password transmitted as evidence of the claim. In addition, authentication might operate under a "three-strikes-and-you're-out" erroneous password limitation. If so, the verifier would consult state information (context), viz., the number of password misses, as part of the decision. The verifier makes a decision to accept or reject the claim to identity by comparing the evidence presented to reference data and by considering the limitations that might be imposed by context.

Figure 4:
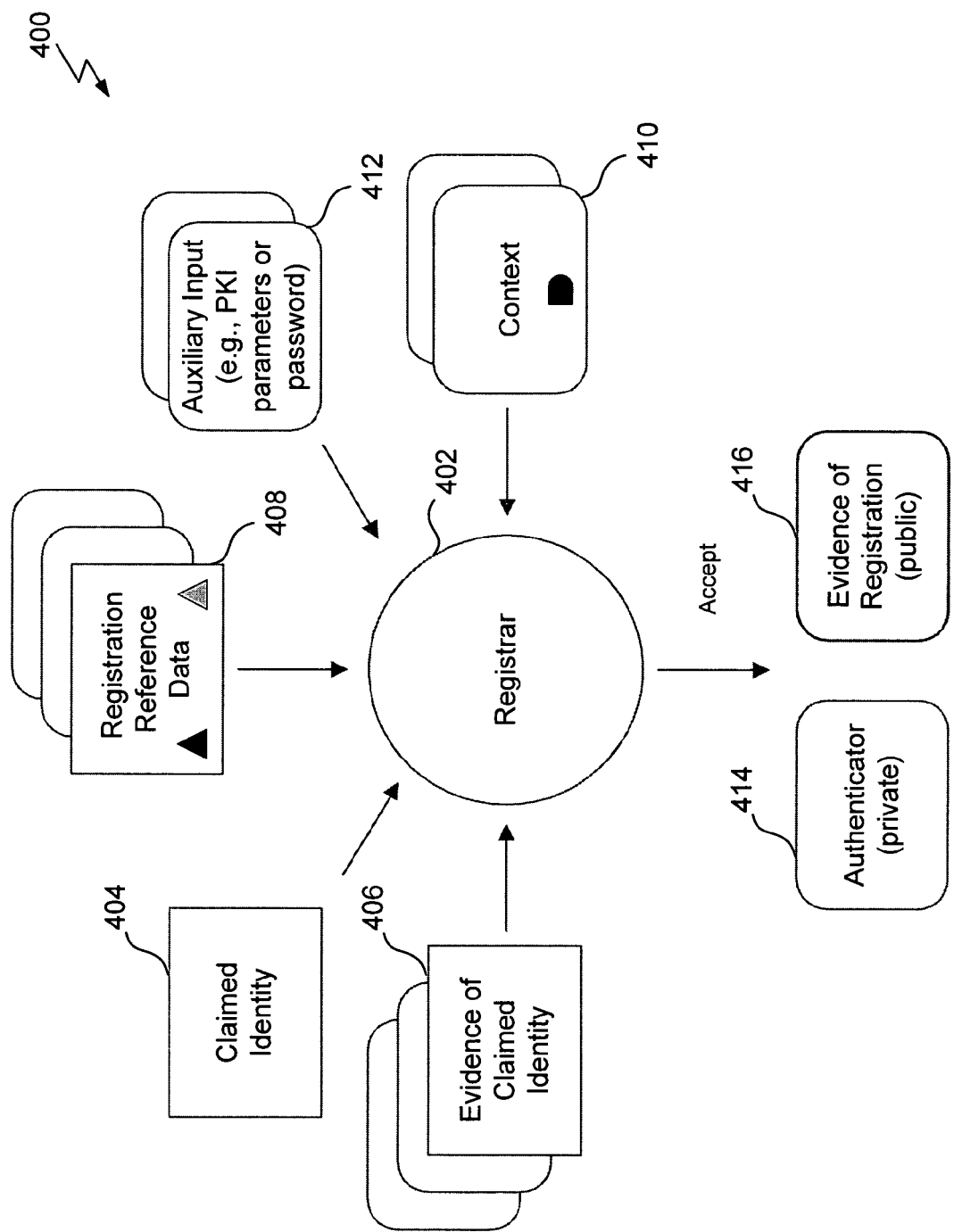
FIG. 4 is a block diagram showing a registration mechanism.

The authentication abstraction of FIG. 3 can be modified to produce an abstraction 400 for the related process of registration, illustrated in FIG. 4. In FIG. 4, a claimant presents evidence to a registrar 402 to establish an identity which can be used in the system served by the registrar. The evidence input to the registrar 402 in this embodiment includes a claimed identity 404, evidence of the claimed identity 406 (e.g., a driver's license), registration reference data 408, context 410, and auxiliary input 412 (e.g., PKI parameters or passwords). The data in auxiliary input 412 may be included in the authentication reference data 308 in FIG. 3. The registrar can be an element of the system from which the claimant seeks services or it could be an independent entity providing registration or other services. The registrar, paralleling the actions of a verifier in authentication, determines if a registrant's evidence of an identity claim is sufficient to allow the claimant to join the system at all. The evidence of claim, the reference data, and context information need not be, and usually are not, the same as that used in authentication. If the evidence is sufficient, registrar 402 accepts the claimant and privately issues the claimant an authenticator 414 and publicly displays evidence of the registration 416.

Creating an abstraction for access control as it is found in distributed systems may be more difficult since the points where the authentication decision, the access control decision, and access control enforcement occur can all be different, and access control requests can arrive at either a decision or enforcement point. Thus, an access control abstraction should incorporate these details because the flow of security-relevant information between decision and enforcement points, and the protections afforded this information, can be important considerations in a security design, and hence should be modeled when seeking to represent security features of a distributed system.

Figure 5:
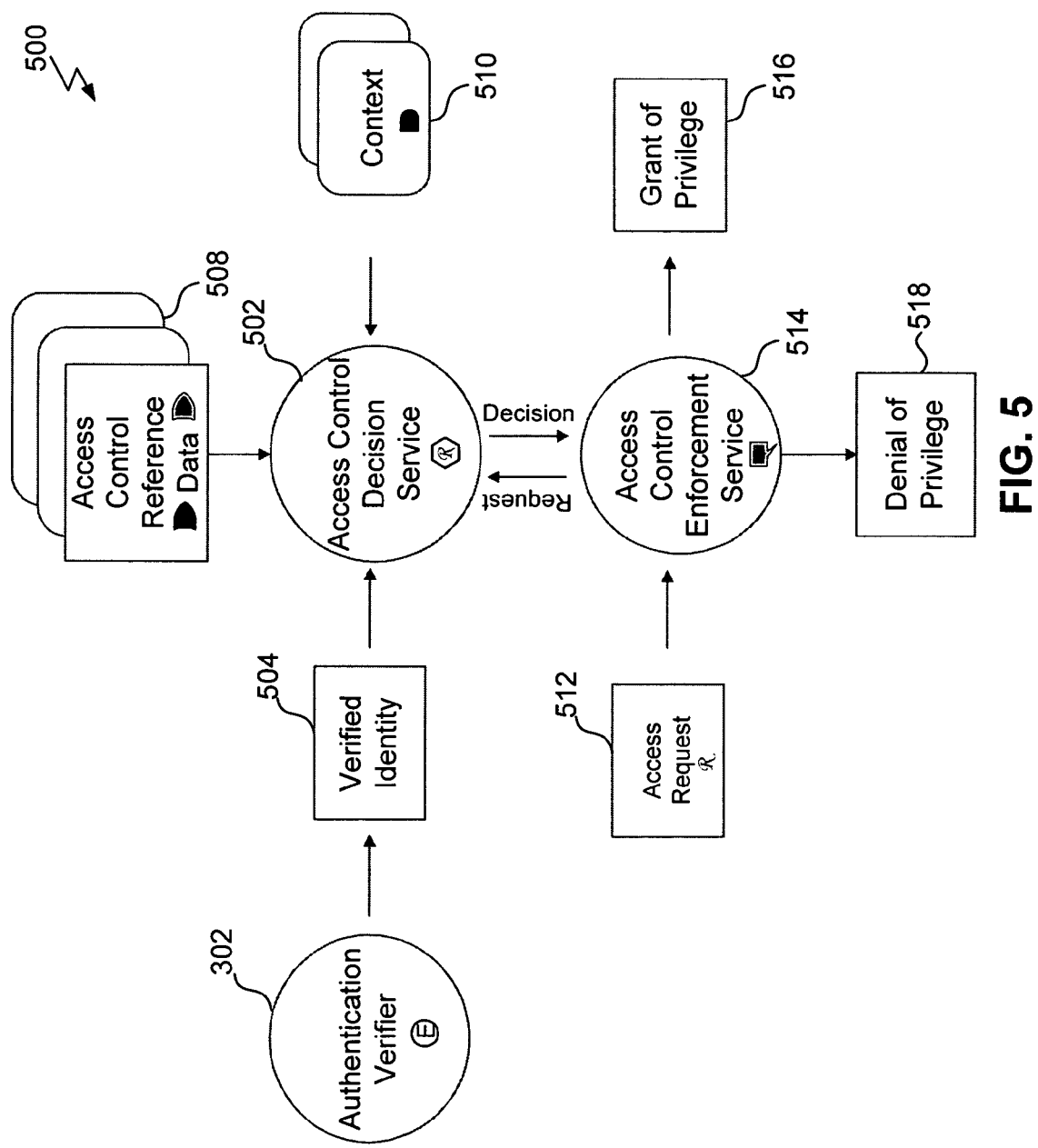
FIG. 5 is a block diagram showing an access control security mechanism.

FIG. 5 shows one possible abstraction 500 of a distributed access control scenario where the authentication decision, the access control decision, and the enforcement of the access control decision each occur at a different place within the system. Other scenarios are possible, and various abstractions may be created that show the relationship among the authentication verifier, the access control decision service, and the access control enforcement point in the scenarios that can occur. For example, all three services may be co-located or only the access control decision and enforcement points may be co-located. Two different access control scenarios are depicted as instance diagrams in FIGS. 21-25, discussed in the Examples section below.

In the scenario shown in FIG. 5, the request for access 512 arrives at an access control enforcement service 514 which must forward it to an access control decision service 502 to make an access control decision. Service 512 can use a verified identity 504 provided from an authentication verifier 302 as an index into access control reference data 508, which establishes what privileges are available to this identity. Just as in authentication, the access control decision 502 service can use context information 510 to adjust its decision based on system state. The results of the access control decision are sent to the enforcement service 514 where privileges are granted 516 or denied 518. All of the information flowing between the services and data stores in a distributed access control scenario can have security relevance. This follows because decisions and grants of access can be changed by altering the inputs to the access control decision and enforcement services. Hence, both the integrity and privacy protections given to the inputs to these services can be a security concern.

Figure 6:
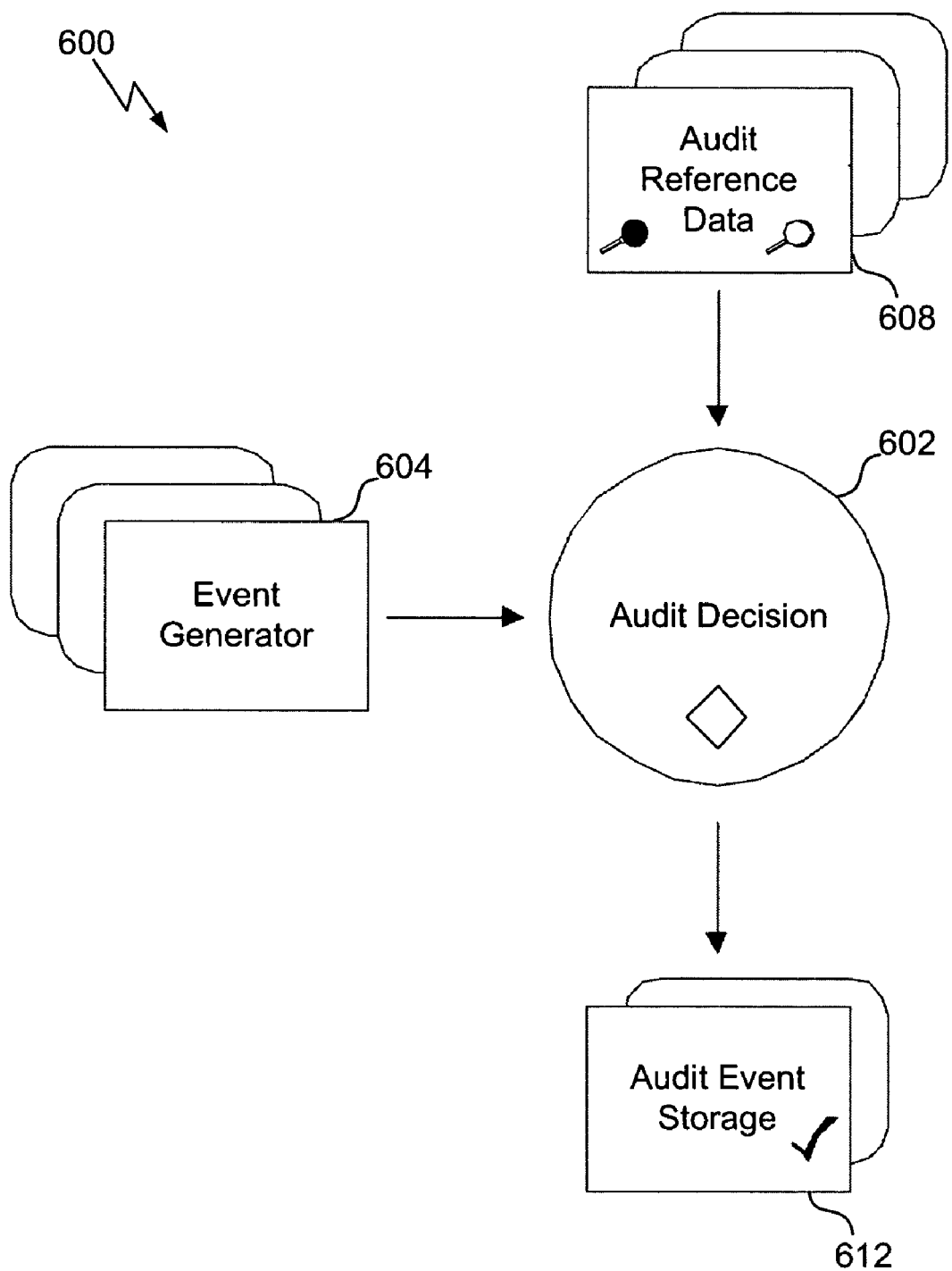
FIG. 6 is a block diagram showing an auditing security mechanism.

FIG. 6 shows an abstraction 600 of an auditing security mechanism. Auditing is another decision process, this time with only two types of inputs. Events from an event generator 604 trigger audit decisions 602 which are made using audit reference data 608, the reference data being the conceptual representation of a system's audit policy. Audit decisions result in movement of audit event data to some type of audit event data storage 612. The small symbols shown in abstraction 600 are graphical representations for use in instance diagram details discussed later in this application and are provided in the abstraction for convenience, but are not necessary when creating abstractions to describe security mechanisms of a system according to the embodiments contained herein.

EXEMPLARY SPECIFICATION

As discussed above, a specification may be created using the abstractions that describe security mechanisms of a system. The specification models components of the security mechanisms, features of the environment in which the system operates, and supporting security features. The specification is a set of definitions governing individual components and features of the system and its environment and guides the constructions of instance diagrams and instance models.

An exemplary specification will now be described. This exemplary specification is provided for illustration purposes only, and it should be understood that other specification details may be crafted and are covered by the present invention. For convenience, the exemplary specification described herein uses a simple and easily remembered syntax, instead of which using a more elaborate and less memorable alternative such as regular expressions. The syntax for the exemplary specification will first be introduced, and then the specification itself will be described using the syntax.

The exemplary specification contains three types of definitions: StringTypes—strings of characters used for names, numbers, and abbreviations; Constants—values and utility definitions useful across different modeling efforts using the specification; and VTypes—the base components used to model system and security features. VTypes are collections of pairs consisting of a field name and a field value. Field values are themselves collections of StringTypes, constants, or VTypes.

StringTypes allow field values to be strings of characters which can be rendered directly. As an example, a StringType definition could be a StringType name followed by:=, the word STRING, and one or more bracketed lists from which string elements are selected.

STRING is one example of a "selector." Other examples of selectors are SET and CHOICE, and either SET or STRING can show the required number of elements in the selection using a pair of parentheses in front of each bracketed list. SET allows selection of zero to many items from a list, while CHOICE means to select a single item from a list. Thus, STRING (m:n) [list] means to select no fewer than m and no more than n elements from the list of elements in the brackets. Either m or n can be omitted so that (:)=(0: ∞), and (:n)=(0:n). If the selection has zero as its lower limit and no upper limit, the parentheses can be omitted. For example, AlphaNumString:=STRING [a-z][0-9] is equivalent to STRING (:)[a-z] (:)[0-9].

The exemplary specification also includes constant definitions. An example of a constant in the exemplary specification is NULL, used to specify the set where no selection is made, i.e., NULL=[ ]. Constants can also appear as quoted values with Ellipsis:=" . . . " being an example. Like the value of a StringType, quoted values denote that the value should be rendered (displayed) directly in an instance diagram. For example, if "E" appears in a constant or VType definition, the letter E should appear in any rendered "instance" of the constant or VType definition.

A VType definition follows the pattern shown below, where optional terms appear in italics. The second line of the definition contains an optional sub-type selector whose purpose is explained shortly.

SampleVType :=
    CHOICE [List of Sub-types]
    Qualifier FieldName$_0$ Selector [List of StringTypes, constants, or VTypes]
    Qualifier FieldName$_1$ Selector [List of StringTypes, constants, or VTypes]
    .
    .
    Qualifier FieldName$_n$ Selection [List of StringTypes, constants, or VTypes]

As noted above, VTypes are the base components used to model system and security features. Thus, a model builder constructs an instance model or diagram by using a set of "instances" of VTypes. Specifically, the model builder creates instances of chosen VTypes by providing a) a name for each instance which is unique among all instances of that VType, and b) StringType values, constants, or names (references) of other VType instances for each field of the instance being defined. For example, an instance of Sample VType with no Sub-type selector and n=2 might be:

SampleInstance => SampleVType
    CHOICE [A, B, C]
    FieldName$_0$ X
    FieldName$_1$ Y
    FieldName$_2$ Z where X, Y, and Z could be names (references to) other VType instances. The notation "=>" indicates creation of an instance of SampleVType whose name in a model is SampleInstance. If a field is not explicitly populated in an instance declaration, its field element is taken as NULL.

Although in this description of the exemplary specification the VType field names appear as the generic FieldName, in actual VType definitions field names carry the semantic information about the field itself and how it might relate to an "owner" instance. Thus, for example, the field name/field value pair, DisplayName NameString indicate that the instance in which the pair appears has a string of characters which can be rendered (displayed) as the instance name. Illustration of actual use of VType definitions is provided below in Example 1, which includes a fully-instantiated instance model corresponding to FIG. 20.

As discussed above, the specification may be linked to graphical representations, or "renderings." A link to how a component or feature is rendered may be provided by the special field name Render, which appears as the last field name for many VTypes. The field value for a render field has the special form {Rn, Augmentation, Style} or {CRn, Augmentation, Style} where n is a number, Augmentation is an addition or change to the base graphical rendering, such as indices and the border style for some graphical representations, and Style is the style for rendering text, which may include designation of font, typeface, size, color, italic or bold accents. As an example, if the render fields do not require Augmentation or Style values, the render field may appear as:

Render {R367} which means to render its associated VType however rendering R367 prescribes.

Some definitions appear with sub-types who need only be expanded to a single Render field. In the generic VType definitions that follow, example graphical representations, or renderings, may be illustrated in accompanying figures with the associated render value appearing therebelow. For readability, the Render field is dropped entirely from the example VType definitions described herein, with the render value appearing next to the sub-type name as in:

Direction CHOICE [Bi-Directional {R12}, Uni-directional {R13}].

By convention, any VType field except the first one can appear with a leading OPTION qualifier, meaning that use of the field is optional in an instance declaration. The other field qualifiers are EXTERNAL and REFERENCE, which cannot appear together but can appear after OPTION. The OPTION qualifier is included to omit fields from instance definitions entirely, which is slightly different than including fields but declaring them with NULL values.

Unless otherwise qualified, the values or references associated with field names of an instance declaration bind the values and instances referenced to the instance "owning" the field names. This binding means that the "owner" instance can propagate properties, and render as part of itself, all owned values or instances (recursively). However, both the qualifiers EXTERNAL and REFERENCE change the relationship between an owner instance and any field marked with either of these qualifiers.

An EXTERNAL field is not part of the owner instance in that it cannot be rendered as part of the owner nor can it propagate properties to or inherit properties from the owner instance. EXTERNAL fields are informational, often helping to link one instance to one or more important relatives. For example, a VType Segment may be used to show connectivity between diagram elements. The Segment VType contains two EXTERNAL fields, EndPoint1 and EndPoint2, which name the components to which a Segment instance connects. Neither EXTERNAL field is "owned" by the Segment instance, and Segment properties do not flow to these EXTERNAL fields.

In some modeling situations, it is useful to have one model component display a reference to a different component without implying ownership of the referenced component. The ability to display a reference without implying ownership can often help simplify a diagram. The REFERENCE qualifier, which requires constants or VTypes as field values, indicates that only the reference in the field value, not the instance referenced, is owned.

As noted above, the exemplary specification includes selectors STRING, SET and CHOICE. It should be reminded that other syntax may be used, and the details of the exemplary specification are provided for example purposes only. Unlike STRING, elements selected with SET must be unique and the order of elements is irrelevant. For example with the expression FieldName SET (2:3) [w, x, y, z]

[y, w, x] and [w, z, y] are both valid selections and are equivalent to each other, while [w, w] or [x, y, y] are invalid selections. The use of CHOICE=SET (1:1) makes it easy to remember that one candidate value is chosen as in FieldName CHOICE [w, x, y, z].

In some VType definitions the reserved word CHOICE appears on the line following the starting line of the definition. The appearance of CHOICE on the second line of the definition indicates that this VType has sub-type options. For example, the definition:

AnotherVType :=
    CHOICE [A, B, C]
    $Field_0$     ASecondVType
    $Field_1$     AThirdVType defines three VTypes, A, B, or C, each of which can be instantiated individually. Thus, the instance AInstance => A
    $Field_0$ X
    $Field_1$ Y can exist. It is also possible that one or all of the types have separate (and partial) definitions as in:

B :=
    $Field_a$ AFourthVType
    $Field_b$ AFifthVType.

VTypes inherit all of the fields from any super-type definitions. Thus an instance of B requires populating four, not two, fields:

BInstance => B
    $Field_a$ U
    $Field_b$ V
    $Field_0$ W
    $Field_1$ Z.

Using Field Values

Sometimes the specification needs to be able to declare how to render a field value as instantiated. The specification syntax uses the pattern This VType.Field to mean the value of Field in an instance of This VType. For example, if a field is declared as ThisField SET [Sample VType.$FieldName_0$]

the result is that the set of ThisField values is selected from any instance of $FieldName_0$ for any instance of SampleVType. Similarly, the exemplary specification uses the keyword Any to mean "any." Thus to choose from the display names of any VType, Any.DisplayName works. Also, if a field declaration needs to refer to an instance of its own VType, the keyword 'This' is used as in This.DisplayName. For example, if a field is declared as ShortName Abbreviation and the Render field is declared as Render {This.ShortName} then the VType instance may be rendered as the field value of ShortName, i.e., "Abbreviation", or any other field value which may be declared for ShortName.

The VType definitions of the exemplary specification will now be described. As discussed above, the specification models components of the security mechanisms, features of the environment in which the system operates, and supporting security features. Accordingly, the exemplary specification includes VType definitions for these components and features.

The components of the security mechanisms and features of the system environment include decision points, system entities, security relevant information such as authenticators, and storage. The supporting security features include communication mechanisms, grouping mechanisms, refinements, key material, stored data types, transformations, and dependency relationships. Further description of these components and features are described below.

Figure 7C:
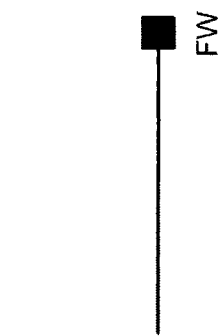
FIGS. 7A-7C illustrate graphical representations for system entities: actor, application service, and segment end entity.
Figure 7B:
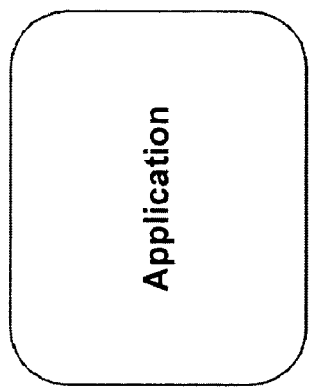
Figure 7A:
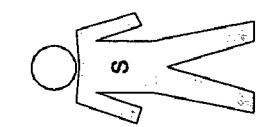

System entities include active system components, but do not include storage. FIGS. 7A-7C show sample renderings for three system entities, Actor (R1), Application Service (R2), and Segment End Entity (R3). Actor types are defined by the model builder as needed and are typically identified in a diagram with an abbreviation appearing on the actor's chest. A rule of construction for constructing and interpreting diagrams is that anything an actor touches it controls. For example, if, in FIG. 8, the CAD system delivers a password, the interpretation is that the password is the actor's since the actor touches the CAD system in this rendering. The "Controls" field of the Actor definition is used to hold the name of the component controlled by the actor.

ApplicationService components include anything that could qualify as an application or a service including user applications, operating systems, and firewalls. The "Content" field indicates what functions the ApplicationService performs, such as security decisions. The "Security Position" field labels the ApplicationService as either secure or unsecure, as adjudged by the model builder.

In many modeling situations, it is useful to have the ability to show certain system entities as "low-visibility" components, i.e., the model builder wants to represent their existence but not much else. In the exemplary specification, SegmentEndEntities perform this function. As the name implies, SegmentEndEntities end segments and typically find use in modeling network-level components that terminate a property on a segment. While not always true, SegmentEndEntities appear on the border of some other component. The "Location" field is used to indicate where a SegmentEndEntity attaches to another component. The "Position" field indicates where the SegmentEndEntity resides relative to that component. The use of SegmentEndEntities will become clearer with an example presented later.

Figure 8:
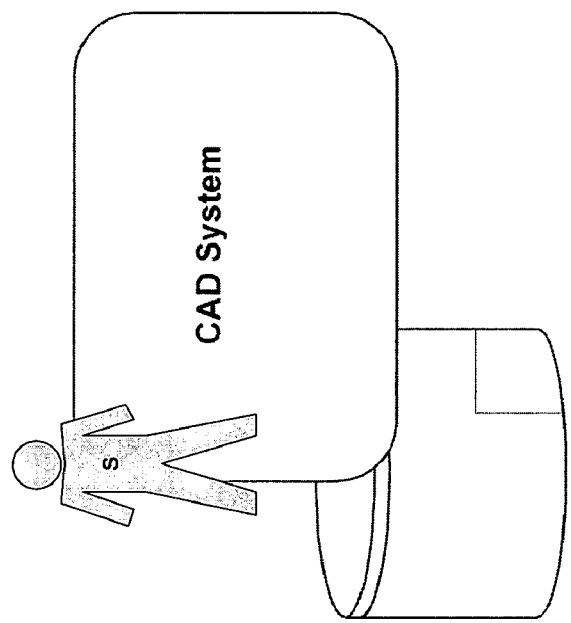
FIG. 8 illustrates a graphical representation for an application cluster.

The ApplicationCluster definition provides a device to de-clutter a diagram. Anchored by an ApplicationService, the ApplicationCluster groups Actors, Storage, and other ApplicationService without showing communications segments between individual components. In an instance diagram, a segment exists whenever individual components touch. In an instance model, the segments are explicit in the "InternalConnections" field element. FIG. 8 is an example of an Application Cluster.

Generic VType definitions for the system entities of Actor, Application Service, Application Cluster, and Segment End Entity follow. It should be kept in mind that the details of these definitions are flexible and extendable, and various modifications can be made without departing from the spirit and scope of the invention. The following details are provided for illustration purposes only and should not limit the scope of the present invention.

```
Actor :=
    DisplayName      NameString
    ShortName        Abbreviation
    OPTION EXTERNAL Controls CHOICE [Zone, ApplicationService,
        ApplicationCluster]
    Render           {R1}
ApplicationService :=
    DisplayName      NameString
    ShortName        Abbreviation
    Content SET      [Application Service, AuthenticationDecisionPoint,
        AccessControlBlock, ACDecisionPoint, AuditDecisionPoint,
        ACEnforcementPoint, DependencyRelation, Collection]
    OPTION Security CHOICE     [Secure, Unsecure]
    Render           {R2}
SegmentEndEntity :=
    DisplayName      NameString
    ShortName        Abbreviation
    Index            Number
    OPTION EXTERNAL Location CHOICE [ApplicationService,
        ApplicationCluster, Zone, Storage]
    OPTION Position CHOICE     [Outside, Inside, Perimeter]
    Render           {R3}
ApplicationCluster :=
    Anchor              ApplicationService
    Members             SET (1:) [Actor, ApplicationService, Storage]
    InternalConnections SET(1:) [Segment]
    Render              {CR1}
```

Storage includes the system components used to hold data, and includes datastores and directories. Datastores include, but are not limited to, shadow datastores (or shadow databases) and non-persistent datastores (or non-persistent storage). Storage-related VTypes include the supporting security features of stored data types and stored security data. Stored security data may include stored passwords, stored PINS, and key material such as PKI keys and symmetric keys.

Figure 9C:
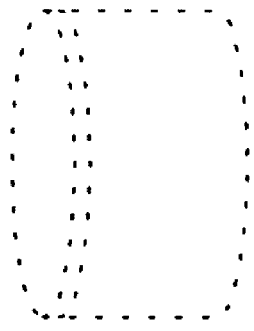
FIGS. 9A-9E illustrate graphical representations for storage components.
Figure 9E:
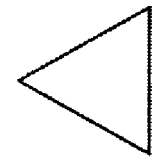
Figure 9B:
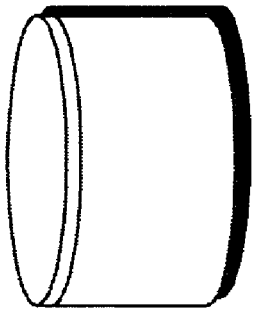
Figure 9D:
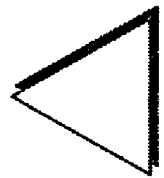
Figure 9A:
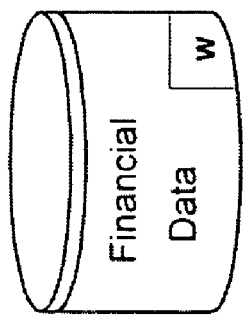

Sample renderings for storage components (i.e., R4-R8) appear in FIGS. 9A-9E. In FIG. 9A, the database R4 appears with a W in the fenced area in the lower right corner. This fenced area contains any StoredDataType abbreviations the model builder wishes to show. In addition, Database R4 and Directory R7, as well as ShadowDatabase R5 and Shadow Database R8, may include renderings for securing relevant information that the model builder wishes to show as stored therein. Both the ShadowDatabase R5 and ShadowDirectory R8 give the model builder the ability to include storage elements which are second in authority to some primary data store named in the Base field. NonPersistentStorage R6 is useful in modeling the temporary storage of security information.

Generic VType definitions for storage components, Stored Data Type, and Security Data are as follows:

```
Storage :=
    CHOICE [Database, ShadowDatabase, Directory, ShadowDirectory,
        NonPersistentStorage]
    DisplayName    NameString
    ShortName      Abbreviation
    StoredData     SET  [StoredDataType]
    SecurityData   SET  [SecurityReference, StoredSecurityData,
        AuditRecord]
    AllOtherData   SET  [OtherData]
    OPTION Security CHOICE   [Secure, Unsecure]
StoredDataType :=
    DisplayName NameString
    ShortName Abbreviation
```

```
    Render      {This.ShortName}
StoredSecurityData :=
    CHOICE      [StoredPassword, StoredPIN, PKIKey, SymmetricKey]
    EXTERNAL    UsedAt SET [DependencyRelation, Transform]
```

As noted earlier, supporting security features may also include communication mechanisms such as segments and channels. Segments are abstractions used to model a communications link between two entities in a diagram, and therefore a segment may be bi-directional or unidirectional. FIGS. 10A-10B show sample renderings for a bi-directional segment R12 and a unidirectional or directed segment R13, respectively. A segment could be realized by a single wire or by any number of different physical media strung end-to-end. A segment extends across its length to the first system entity or storage component encountered, and may bore through intervening zone boundaries.

To show physical or security properties attached to segments, segment instance definitions may include refinements such as segment properties. Segment properties may include encryption or privacy properties and segment medium types such as whether the communications link is wireless or voice. By default, a segment property's scope is along the segment on which it is defined (appears in a diagram) and across any adjoining segments to the first actor, application service, or storage component encountered. However, in many modeling situations properties terminate on or near zone borders, and at equipment or devices whose full inclusion in a diagram is surplus detail.

Figure 11:
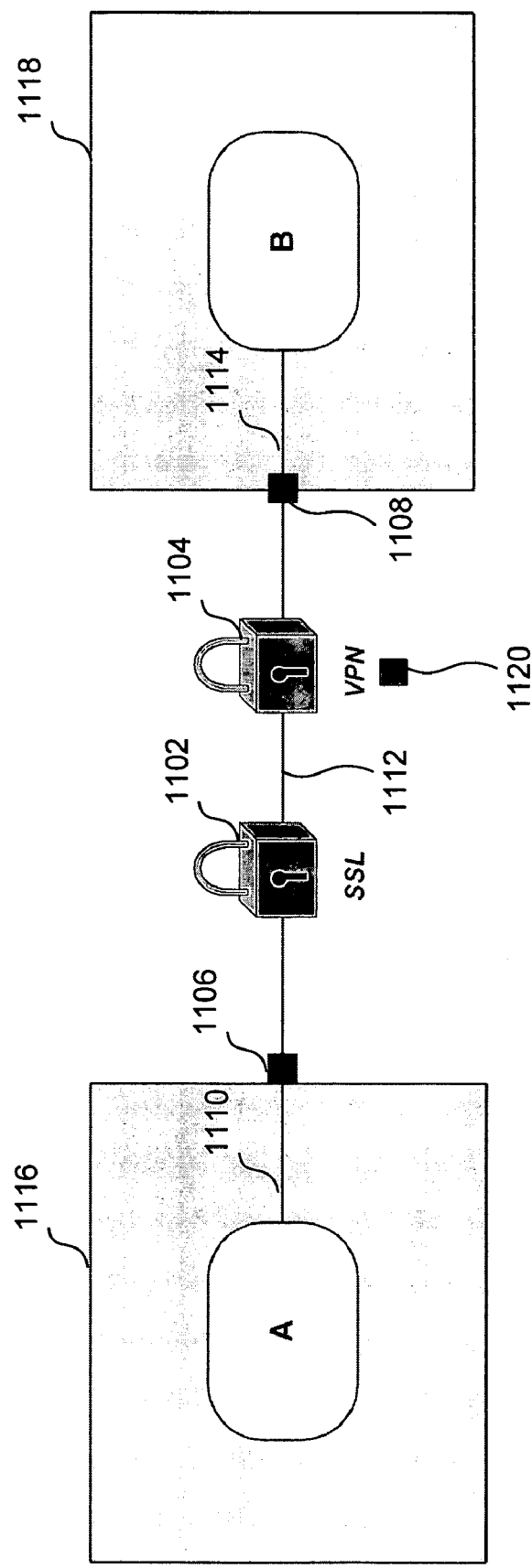
FIG. 11 is an instance diagram depicting segment properties and property scope declarations.

In order to model the components which can terminate properties, the exemplary specification includes the SegmentEndEntity. This feature terminates segments but does not terminate segment properties unless it is explicitly declared to do so. Such explicit scope declarations name the one or two SegmentEndEntities that terminate the segment property. The symbol used at the segment property to show explicit scope is the same as that of the matching the SegmentEndEntity or entities. For example, FIG. 11 shows how segment properties and scope may be depicted in an instance diagram. FIG. 11 depicts a situation regularly encountered—one layer of encryption is tunneled through another layer as communications flow back and forth. Two privacy segment properties, SSL 1102 and VPN 1104 (represented as lock icons), two SegmentEndEntities 1106 and 1108 (represented as solid squares), and three segments 1110, 1112 and 1114 are shown. One segment 1110 connects application A in zone 1116 to a left SegmentEndEntity 1106, a second segment 1112 connects SegmentEndEntity 1106 to SegmentEndEntity 1108 and a third segment 1114 connects the rightmost SegmentEndEntity 1108 with application B in zone 1118. Since no property scope is declared for SSL, its scope is the default, from application A to B. The scope for the VPN property is explicit, with a scope symbol 1120 underneath the lock property symbol 1104 that matches the solid square symbol representing the SegmentEndEntities. Accordingly, the scope of the VPN property extends left and right to the SegmentEndEntities at the edges of the two zones. Note that the diagram indicates that the SegmentEndEntity 1106 at the left does not belong to the zone 1116 containing application A since it lies outside the zone's border.

Generic VType definitions for segments and segment properties are as follows:

```
Segment :=
    Direction CHOICE    [Bi-DirectionalSegment {R12},
        DirectedSegment {R13}]
    EXTERNAL End Point1 CHOICE      [SystemEntity, Storage]
    EXTERNAL End Point2 CHOICE      [SystemEntity, Storage]
    OPTION Properties SET [SegmentProperty]
    OPTION Mark SET [ChannelMark]
    OPTION Security CHOICE      [Secure, Unsecure]
SegmentProperty :=
    CHOICE [PrivacyProperty, SegmentMedium]
    PropertyScope SET [Segment]
    OPTION EXTERNAL EndEntity SET (1:2) [SegmentEndEntity]
    OPTION ExplicitScope CHOICE     [Left, Right, Left + Right]
PrivacyProperty :=
    Type        CHOICE      [SSL {"SSL"}, VPN {"VPN"}, Link {"L"},
                Unknown {"?"}]
    Index       Number
    Render      {R15}
SegmentMedium :=
    Type        CHOICE      [Mail {R16}, Wireless {R17}, Voice {R18},
        RemovableMedia {R19}]
    Index       Number
```

Channels are virtual connections between systems entities or storage components, and may be bi-directional or unidirectional. Bitbuckets mark the beginning and end of a channel. To record the end points, a VType channel definition includes two EXTERNAL fields, StartEntity and EndEntity. Thus, a generic VType channel definition is as follows:

```
Channel :=
    CHOICE [OneWayChannel, PairedChannel]
    DisplayName     NameString
    EXTERNAL        StartEntity     CHOICE [SystemEntity, Storage]
    EXTERNAL        EndEntity       CHOICE [SystemEntity, Storage]
```

In the case of a uni-directional channel between two entities, the channel's start and end points may be depicted by a start bitbucket and an end bitbucket, respectively. If two entities communicate via a bi-directional channel, a model builder can use either two pairs of bitbuckets, with each end of the channel marked with a start and end bitbucket, or a TwoWayBitBucket at each end point if this is appropriate. Sample renderings of start R20, end R21, and two way R22 bitbuckets are shown in FIGS. 12A-12C, respectively. FIG. 13 illustrates a uni-directional channel 1302 between entities A 1304 and B 1306 marked by start and end bitbuckets 1308 and 1310 on the left and right, respectively.

A bitbucket pair may indicate the flow of security relevant information such as an authenticator moving from the entity being authenticated to an authentication decision point. The Content field of a generic VType BitBucket definition lists types of security relevant information such as authenticators, as well general application-level information such as OtherData that could be included an actual VType BitBucket definition:

```
BitBucket :=
    CHOICE [StartBitBucket {R20}, EndBitBucket {R21},
        TwoWayBitBucket {R22}]
    REFERENCE Content SET [Authenticator, PrivilegeCredential,
        ReferenceExtract, Request, Decision, AuditRecord, Nonce,
        OtherData]
```

Supporting security features that may also be modeled by the specification are grouping mechanisms, which include clustering and zones. A specific application of a clustering mechanism is the system entity of ApplicationCluster, discussed above. Another grouping mechanism is a zone. By definition, zones group model elements together when they are related by some criterion. Model components can exist in zones when, for example, a) they share the same physical location, b) they share the same physical hardware, or c) they belong to the same organization. It should be apparent that other zone type criteria may be added as needed, such criteria not being limited to the examples above.

FIG. 14 depicts a zone rendering 1400 with an area 1404 for displaying the zone's type, i.e., its properties, and one or more zone names carved out in the lower right corner. Area 1402 may include renderings of model components that exist in zone 1400. FIG. 14 generically presents "Zone.DisplayName" as the zone name. In addition to the zone name, zone types such as "workstation", "computing center", or "generic building" and zone properties such as "physical security" and "zone access" may be included the lower right corner. Alternatively, a model builder may prefer to display such zone information in another corner or elsewhere in or near the zone. FIGS. 15A-15E display example renderings of zone types. FIGS. 15F-15G display example renderings of zone properties.

Zones can appear within zones with no restriction on how deep nesting can be. The practical limits imposed by trying to display nested zones and actual modeling requirements limit zone depth to about three. Any property that applies to a surrounding zone, also applies to any zone within an outer zone's borders. A generic VType zone definition, having a "Facility" zone type further defined to show optional zone properties which may also be modeled, is as follows:

```
Zone :=
    CHOICE         [Organization {R23}, Facility, LargeComputer {R24},
                    Workstation {R25}]
    DisplayName    NameString
    ShortName      Abbreviation
    Contents       SET [SystemEntity, Storage, Zone, Segment]
    OPTION Security CHOICE [Secure, Unsecure]
    Render         {R30}
Facility :=
    Type           CHOICE [ComputingCenter {R26}, GenericBuilding
        {R27}]
    OPTION Properties    CHOICE (1,2)[PhysicalSecurity {R28},
        ZoneAccess {R29}]
```

To support the depiction of where and how important security decisions are made, the specification includes VType definitions for each of authentication, access control, and audit decisions. Such decision points include authentication, access control, and audit decision points and the related access control enforcement point. Sample renderings for these decision points appear in FIGS. 16A-16C, and a sample rendering for the access control enforcement point appears in FIG. 16D.

An Authenticator carries information about an identity and the evidence of identity to an Authentication Decision Point as illustrated in the abstraction for the authentication security mechanism discussed above. The exemplary specification uses single-letter abbreviations for authenticators, with the abbreviations mapping to the type of service performing authentication as follows: A—Application; N—Network; O—Operating System; E—Enterprise. The input to the authenticator may include, for example, passwords, personal identification numbers (PINs), and security tokens.

Authenticators can travel in bitbuckets, and an instance diagram or model may typically contain a number of channels defined with bitbuckets containing authenticators. At the Authentication Decision Point, the authenticator is placed within the decision point boundary to link the authenticator and the decision based on it. For example, an application authenticator may appear as an "A" inside the circle rendering for the authentication decision point, which shown in FIG. 16F corresponding to render value R39. Similarly, since access control decisions are the result of a request for access, a request for access whose display name may be depicted as R with an index if appropriate, appears in the hexagon rendering for the access control decision point, as shown in FIG. 16G corresponding to render value R40. Also shown in FIG. 16E is a rendering for an audit record (R43) generated from an audit decision as illustrated in the abstraction for the audit security mechanism discussed above.

FIGS. 17A and 17B show the visual representations of requests. As shown in FIG. 17A, left-justified in a Request rectangle 1702 are Tar:, followed by a name for the resource being requested, Prv:, followed by a description of what type of access is being requested, and Rol:, followed by the name of the system entity requesting access. At the top right of the rectangle is the display name for a request, always R with an index if appropriate. Below that are references to the policy governing this request and a reference to the authentication decision point which verified the identity of the entity in the Request Subject field.

Render value 45 in FIG. 17B shows how access control requests, decisions, and enforcement are linked when graphically rendered. Providing that a number of requests have common decision and enforcement points, requests are stacked in an access control block callout 1704. The callout attaches to an application service providing either the access control decision, the enforcement, or both. In the former two cases, the model builder can decide where it is more convenient to attach the callout and then reference the other location. For instance, in FIG. 17B the "Dec" below the horizontal line refers to the decision point with the callout attached to the enforcement point. If, on the other hand, the callout attached to the decision point alone, the bottom of the callout would refer to the enforcement point with "Enf." If the decision and enforcement point are the same, the space below the horizontal line is left blank.

Generic VType definitions for an authenticator, decision points, and a request are as follows:

```
Authenticator :=
    Type             NameString
    TypeAbbreviation              Abbreviation
    TypeIndex        Number
    OPTION EXTERNAL InputRelation    DependencyRelation
```

```
Render   {This.TypeAbbreviation}
DecisionPoint :=
   CHOICE [AuthenticationDecisionPoint, ACDecisionPoint,
      AuditDecisionPoint]
   DisplayName     NameString
   ShortName                         Abbreviation
AuthenticationDecisionPoint :=
   REFERENCE Claim                   Authenticator
   EXTERNAL Ground    SET (1:) [AuthenticationReferenceData,
   AuthenticationReferenceExtract]
   EXTERNAL OtherInput SET [Context, ContextExtract]
   Render   {R39}
AccessControlBlock :=
   RequestBlock SET (1:) [Request]
   REFERENCE ActionBlock      CHOICE [ACDecisionPoint,
      ACEnforcementPoint]
   Render   {R45}
ACDecisionPoint :=
   REFERENCE RequestDecided          SET (1:) [Request]
   EXTERNAL DecisionService   ApplicationService
   Render   {R40}
ACEnforcementPoint :=
   REFERENCE RequestEnforced         SET (1:) [Request]
   EXTERNAL EnforcingService   ApplicationService
   Render   {R42}
Request :=
   DisplayName               "R"
   Index                     Number
   REFERENCE Target          CHOICE [Storage, ApplicationService,
      PrintableString]
   REFERENCE Privilege       PrintableString
   REFERENCE Subject         CHOICE [ApplicationService, Actor]
   REFERENCE Policy          CHOICE [AccessControlReferenceData,
      AccessControlReferenceExtract]
   REFERENCE   AuthIdentity  AuthenticationDecisionPoint
   Render   {R44}
AuditDecisionPoint :=
   DisplayName    NameString
   ShortName      Abbreviation
   Index          Number
   EXTERNAL AuditData SET (1:)       [AuditRecord]
   Render         {R41}
```

Security mechanism components may also include security relevant information such as reference data, reference extracts, credentials, and audit data, which may include the audit record produced from an audit decision. Security Reference Data is a set of reference, policy, and state information which a decision point can access after it receives a request to make a decision. This information may include credentials or other authentication or access control reference data, audit reference data, and context accessible to the respective authentication, access control, and audit decision points describe above. The specification may include a SecurityReferenceBase definition that lists the types of security reference data which are authoritative. Reference extracts are compilations, summaries, or transformations of the authoritative sources. Generic VType definitions for security relevant information appear below, with associated renderings illustrated in FIGS. 18A-18H.

```
SecurityReferenceBase :=
   CHOICE [AuthenticationReferenceData, AccessControlReferenceData
      {R32}, AuditReferenceData {R33}, Context {R34}]
   Index          Number
AuthenticationReferenceData :=
   REFERENCE   Grounds SET [Authenticator]
   Render         {R31}
ReferenceExtract :=
   CHOICE [AuthenticationReferenceExtract {R35},
```

```
                     -continued

AccessControlReferenceExtract {R36}, AuditReferenceExtract
      {R37},
   ContextExtract {R38}]
   Index          Number
   EXTERNAL    Base    SecurityReferenceData
```

Other supporting security features which may be defined in a specification include dependency relationships (the DependencyRelation VType) and transformations (the Transform VType). A DependencyRelation is a mechanism by which the abstract relationship "depends on" is established between a single dependent model component and a set of one or more independent model components. Using its rendering as an arrow (→), the relationship's meaning is that the set of independent elements is the input to some process, algorithm, or protocol whose result or output is the dependent element. An example of the use of DependencyRelation is an authenticator dependent upon a password and PIN. How the relationship between password, PIN, and authenticator is implemented is not depicted in detail, although the Transform VType can add some detail. The Transform VType for transformations allows showing some technical details on the input side of a DependencyRelation. Transformations include encryption, decryption, and hashing. The specification may further include a VType definition for a "represents" relationship between model components, as opposed to the "depends on"

for DependencyRelation. The Collection type is available to represent a "depends on" relationship. Like Dependency Relations, Collections have an input and output side but the meaning is that the output is a visual alias for anything on the input side. This representation carries forward to multiple locations so that if w represents, x, y, and z, wherever w appears, the interpretation is that the appropriate x, y, or z exists. Even though there may be visual ambiguity here, the underlying textual model can be made unambiguous. FIGS. 19A-19C show example renderings of DependencyRelation (R46), Collection (R47) and Transform (R48), respectively.

A PrivilegeCredential type, created with a DependencyRelation, is used to bind an identity with some set of system privileges, which can then be delivered to some relying system component. As such a PrivilegeCredential may be rendered as a type of security token. The OtherData type may by used to allow a model builder to include data that can be security-related in certain instances. The exemplary specification also includes types and their renderings for diagram comments. The Documentation type links a diagram to related documentation. The Annotation type provides a standard, and an easily recognizable way of including comments in a diagram. Generic VType definitions and supporting subtypes for dependency relationships, transformations, and collection are provided below:

the zone boundary. Legends may also be used on an instance diagram to help identify various diagram elements. For example, in diagrams that contain a number of application level authentications, typically using authenticators denoted with "A" and an index, each of the $A_i$ is a candidate for inclusion in a legend where some detail about $A_i$ is provided.

EXAMPLES

The following examples demonstrate how the definitions of the exemplary specification are used to build an instance diagram and how the diagram is interpreted.

Example 1

An Instance Diagram and Model

This example demonstrates an instance diagram constructed using the exemplary specification. The example models the following situation which is a scaled-down version of what might be found in practice. A financial services company (FSC) allows its customers to access their financial information via an application and associated database resident at the company's facilities. Using an Internet browser, a customer connects to the FSC facilities through Web servers

```
DependencyRelation :=
   REFERENCE Bluntside SET (1:) [AuthenticationMethod,
      AuthenticationDecisionPoint, ACDecisionPoint, PrivilegeCredential,
      Transform, StoredSecurityData, SecurityReferenceData,
      ReferenceExtract, OtherData]
   REFERENCE   Sharpside   CHOICE [Authenticator,
      PrivilegeCredential, OtherData]
   Render   {R46}
Transform :=
   CHOICE [Encryption, Decryption, Hash]
      Arguments      SET (1:) [Transform, PIN, Password,
         StoredSecurityData, Nonce { "N"}, PrivilegeCredential, OtherData]
   Render   {R48}
Collection :=
   REFERENCE Bluntside CHOICE        [SET [Zone] ,SET
      [ApplicationService],SET [PrivilegeCredential, Token] ]
   OPTION REFERENCE BluntContinue    Ellipsis
   REFERENCE Sharpside CHOICE        [Zone, ApplicationService,
      PrivilegeCredential, Token]
   Render   {R47}
AuthenticationMethod :=
   CHOICE [Password, PIN, PKIKey, SymmetricKey]
Encryption :=
   Type      NameString
   Key       NameString
   Index     Number
   Render    { "E"}
Decryption :=
   Type      NameString
   Key       NameString
   Index     Number
   Render    { "D"}
Hash :=
   Type      NameString
   OPTION  Key          [SymmetricKey]
   Render    { "H"}
```

In addition to creation of a specification, modeling conventions may be developed to show sequenced events, such as the sequence of the arrival and departure of bitbuckets at their associated system entities or storage units. For example, the convention may be to display earlier arrivals or departures at the top of a stack of bitbuckets. In addition, zone shading may be used to make it easier to perceive the area encompassed by at a site hosted by a third-party service provider. The modeling task is to describe what security mechanisms are in place, taking the viewpoint of FSC.

An instance diagram 2000 that models the situation just described appears in FIG. 20. The diagram contains a mix of infrastructure, system, and security components. The infrastructure contains three zones: the FSC Data Center zone 2002, the Hosting Facility zone 2004, and a workstation zone 2006, which includes a generic facility zone 2008 labeled "Anywhere" and a specific workstation zone 2007 having a Web browser 2014. The use of dashed lines for all but the FSC Data Center zone 2002 indicates, that from the viewpoint of the FSC, zones 2004, 2006 and 2007 are insecure. Each zone displays its zone type and any zone properties in its lower right corner. For example, the FSC Data Center zone 2002 shows a zone type ComputingCenter represented by rendering 2010 and a zone property PhysicalSecurity represented by rendering 2012.

Zones typically hold SystemEntity and Storage components. The diagram shows three round-cornered rectangles to depict the three applications modeled: Web Browser 2014, Web Hosting Service 2016, and Financial System 2018. Zone 2006 also contains a customer actor 2020, with the customer's identifying abbreviation C appearing on the actor's chest. The fact that the customer touches the workstation zone 2007 indicates that all workstation activities of relevance to this model are under the control of the actor.

The diagram also contains three storage components 2022, 2024, 2026 all located within the FSC Data Center zone 2002. Each storage component contains one or more abbreviations in its lower right hand corner indicating the type of data stored: C for customer data and S for security data. The storage components also show various reference data and audit record symbols discussed above.

In FIG. 20, communications between applications and storage components travel over six segments, five of which are explicitly depicted and the sixth, between Financial System and Financial Data, implied. An explicit segment 2028 appears between Web Browser and Web Hosting Service. Note that the existence of a zone boundary at Hosting Facility has no effect on this segment's extent. Segment 2028 also has a PrivacyProperty in the form of SSL encryption, which is shown with the lock icon 2030 and accompanying abbreviation.

A contrasting case is the interpretation of the two segments 2032, 2034 between Web Hosting Service and Financial System. The first segment 2032 terminates at a SegmentEndEntity 2036 positioned at the FSC Data Center zone 2002 boundary. This segment has a VPN property whose rightward scope is shown explicitly by the small square 2038 to the right of the VPN abbreviation. The property mark matches the shape of the SegmentEndEntity. The interpretation is that the property extends on segments rightward until encountering the small filled square. The SegmentEndEntity would of course be realized by some device in the system, probably at the network level. However, showing its details is not important to a security analysis, so it can be defined and rendered as a near invisible SegmentEndEntiy type. What is important is the extent of VPN privacy protection.

The example also shows three channels. One channel 2040 carries an application-level authentication, A, from Web Browser to the Financial System at the Web Hosting Service. Another channel 2042 carries authentication reference data from the User Accounts database to Financial System. The third channel 2044 carries audit records from the Financial System to the Audit Repository database.

Three decision points appear in the example. An application-level authentication decision takes place at Financial System 2018 as shown by the small circle surrounding the authenticator A. Financial System also makes an access control decision as the attached callout 2046 indicates. The callout shows that customers request read/write access to financial portfolio data. Financial System 2018 is both the decision maker and enforcer for this access control request as the absence of an action block in the callout indicates. Examples 2 and 3 will show different access control cases than the one shown here. Finally, the diamond within Financial System 2018 indicates that this service creates audit records of the decisions made within it.

Below is a fully-instantiated instance model corresponding to FIG. 20; instance definitions appear with their "Render" fields omitted:

```
Customer => Actor
    DisplayName    Customer
    ShortName      C
    EXTERNAL Controls   Customer Workstation
Web Browser => ApplicationService
    DisplayName    Web Browser
    ShortName      NULL
    Content        CustomerAuth
    Security       Unsecure
CustomerAuth => DependencyRelation
    Bluntside   [UserPassword, UserPIN]
    Sharpside   AppAuth
UserPassword => Password
    Index
    PolicyDescription NULL
UserPIN =>   PIN
    Length     4
AppAuth => Authenticator
    Type           Application
    TypeAbbreviation A
    TypeIndex      0
    InputRelation  Customer Auth
Anywhere => Facility
    Type           GenericBuilding
    DisplayName    Anywhere
    ShortName      NULL
    Contents       [Customer, Customer Workstation]
    Security       Unsecure
Customer Workstation => Workstation
    DisplayName    Customer Workstation
    ShortName      NULL
    Contents       Web Browser
    Security       Unsecure
Web Hosting Service => ApplicationService
    DisplayName    Web Hosting Service
    ShortName      NULL
    Content        NULL
    Security       Secure
Hosting Facility => Facility
    Type           ComputingCenter
    Properties     PhysicalSecurity
    DisplayName    Hosting Facility
    ShortName      NULL
    Contents       Web Hosting Service
    Security       Unsecure
Browser to Hosting => Segment
    Direction      Bi-directional
    End Point1     Web Browser
    End Point2     Web Hosting Service
    Properties     SSL
Financial System => ApplicationService
    DisplayName    FinancialSystem
    ShortName      NULL
    Content        [UserLogin, FSAudit, FS Access]
UserLogin => AuthenticationDecisionPoint
    REFERENCE Claim      AppAuth
    EXTERNAL Ground      AuthExtract
    EXTERNAL OtherInput  Policy
AuthExtract => AuthenticationReferenceExtract
    Index 0
    EXTERNAL Base AuthReference
AuthReference => AuthenticationReferenceData
    REFERENCE Grounds AppAuth
    Index 0
ACReference => AccessControlReferenceData
    Index 0
AuditReference => AuditReferenceData
    Index 0
Policy => Context
```

```
Index 0
FSAudit => AuditDecisionPoint
    DisplayName    NULL
    ShortName      NULL
    Index 0
    EXTERNAL AuditData CustomerAccessRecord
CustomerAccessRecord => AuditRecord
    ShortName      NULL
    Index 0
    Description    NULL
CustomerDataRequest => Request
    DisplayName    "R"
    Index 0
    REFERENCE Target       Customer Profile
    REFERENCE Privilege    Read/Write
    REFERENCE Subject      Customer
    REFERENCE Policy       ACReference
    REFERENCE AuthIdentity    UserLogin
REnforce => ACEnforcementPoint
    REFERENCE RequestEnforced CustomerDataRequest
    EXTERNAL EnforcingService    Financial System
RDecide => ACDecisionPoint
    REFERENCE RequestDecided CustomerDataRequest
    EXTERNAL DecisionService     Financial System
FSAccess => AccessControlBlock
    RequestBlock CustomerDataRequest
    REFERENCE ActionBlock        [RDecide, REnforce]
Financial Data => Database
    DisplayName    Financial Data
    ShortName      NULL
    Stored Data    CustomerData, SecurityData
    SecurityData   [ACReference, AuditReference, Policy]
    AllOtherData   NULL
User Accounts => Database
    DisplayName    User Accounts
    ShortName      NULL
    Stored Data    SecurityData
    SecurityData   AuthReference
    OtherSecurityData    NULL
Audit Repository => Database
    DisplayName    Audit Repository
    ShortName      NULL
    Stored Data    SecurityData
    SecurityData   CustomerAccessRecord
    AllOtherData   NULL
FSC Data Center => Facility
    Type           ComputingCenter
    Properties     PhysicalSecurity
    DisplayName    FSC Data Center
    ShortName      NULL
    Contents       [Financial System, User
       Accounts, AuditRepository, Financial Data, Finsys to User Accounts,
       FinSys to Audit, FinSys to Financial Data]
    Security       Secure
Hosting to EndEntity => Segment
    Direction      Bi-Directional
    End Point1     Web Hosting Service
    End Point2     Router
    Properties     VPN
EndEntity to FinSys => Segment
    Direction      Bi-Directional
    End Point1     Router
    End Point2     Financial System
Finsys to User Accounts => Segment
    Direction      Bi-Directional
    End Point1     FinancialSystem
    End Point2     User Accounts
FinSys to Audit => Segment
    Direction      Bi-Directional
    End Point1     FinancialSystem
    End Point2     Audit Repository
FinSys to Financial Data => Segment
    Direction      Bi-Directional
    End Point1     Finsys
    End Point2     Financial Data
SSL => PrivacyProperty
    Type           SSL
    PropertyScope  Browser to Hosting
    Index 0
VPN => PrivacyProperty
    Type           VPN
    PropertyScope  Hosting to EndEntity
    Index          0
    EXTERNAL EndEntity Router
    ExplicitScope  Right
Router => SegmentEndEntity
    DisplayName    Router
    Index          0
    EXTERNAL Location FSC Data Center
    Position       Perimeter
CustomerData => StoredDataType
    DisplayName    CustomerData
    ShortName      C
SecurityData => StoredDataType
    DisplayName    SecurityData
    ShortName      S
Bucket0 => StartBitBucket
    REFERENCE Content    AppAuth
Bucket1 => EndBitBucket
    REFERENCE Content    AppAuth
Browser to Host => OneWayChannel
    Start          Bucket0
    End            Bucket1
    DisplayName    Browser to Host Channel
    EXTERNAL       StartEntity Web Browser
    EXTERNAL       EndEntity Web Hosting Service
Bucket2 => StartBitBucket
    Content        AuthExtract
Bucket3 => EndBitBucket
    Content        AuthExtract
MoveAuthReference => OneWayChannel
    Start          Bucket2
    End            Bucket3
    DisplayName    MoveAuthReference
    EXTERNAL       StartEntity User Accounts
    EXTERNAL       EndEntity Financial System
Bucket4 =>         StartBitBucket
    Content        CustomerAccessRecord
Bucket5 =>         EndBitBucket
    Content        CustomerAccessRecord
MoveAuditData => OneWayChannel
    Start          Bucket4
    End            Bucket5
    DisplayName    MoveAuthData
    EXTERNAL       StartEntity Financial System
    EXTERNAL       EndEntity AuditRepository
```

Example 2

Instance Diagrams of an Access Control Scenario

As discussed above, there are several different scenarios that can occur when considering where authentication, access control decision making, and access control enforcement take place. FIG. 21 is an instance diagram 2100 illustrating one such access control scenario. In this scenario, an access request (not shown) arrives at System 2102 which is both the access control decision point and the access control enforcement point. In this embodiment, the travel of a request from requestor to destination is omitted to declutter the instance diagram. Authentication occurs at System 2101. A request block 2105 attached to System 2102 identifies the location where an access control request arrives. The request block 2105 contains the name of the request, R.

An R in a hexagon identifies System 2102 as an access control decision point and a small shaded callout containing the R identifies this system as an access control enforcement point. Data 2104 stores the access control reference data and context reference data used to make the decision to allow or deny request R.

System 2102 needs the authenticated identity of the requestor to make an access decision. The authentication decision is made by System 2101, as indicated by the authentication decision point symbol, A in a circle. The authentication decision is made with reference to authentication reference data and context reference data, if any, stored in Data 2103. The authentication decision is then transported from System 2101 to System 2102 by the bitbucket 2106 carrying the decision point symbol, A in a circle.

FIG. 22 presents an alternative diagram 2200 of the access control scenario depicted in FIG. 21. In this diagram, the explicit access control decision point and access control enforcement point symbols are not used. The flow of the authentication decision from System 2201 to System 2202 is also omitted. The absence of the explicit access control decision point and access control enforcement symbols and the lack of an ActionBlock reference in the AccessControlBlock indicate that System 2202 is both the access control decision point and the access control enforcement point for request R.

An authentication decision point symbol has been added to the Role entry in the request block 2205. This indicates that the A authentication decision will be used to establish the identity associated with the request. Since System 2201 is the A authentication decision point, this indicates that System 2201 performs the authentication associated with this request with reference to authentication reference data and context reference data, if any, stored in Data 2203.

The Privilege entry in the access request block 2205 has been augmented with an access control reference data symbol and a context reference data symbol. These identify the reference data that will be used in deciding whether to allow or deny this request.

In situations where access control decision making and access control enforcement occur at the same place, a simplified diagram 2300 can be used as shown in FIG. 23. In this diagram, the ActionBlock reference, the access control reference data, and the context reference data are omitted from the request block 2305. Since System 2302 performs both decision and enforcement functions and since the requisite reference data is stored locally in Data 2304 the removed items are not necessary to clearly represent the situation.

As in FIG. 22, an authentication decision point symbol has been added to the Role entry in the request block 2305. This indicates that the A authentication decision will be used to establish the identity associated with the request. Since System 2301 is the A authentication decision point, this indicates that System 2301 performs the authentication associated with this request with reference to authentication reference data and context reference data, if any, stored in Data 2303.

The access control scenario depicted in FIGS. 21-23 is typical of large applications such as a database management system (DBMS) that run on top of an operating system. The Oracle DBMS, for example, maintains its own access control reference data and both Oracle and the operating system make and enforce their own access control decisions. In another embodiment, Oracle can use the authentication provided by the underlying operating system.

Example 3

Instance Diagrams of Another Access Control Scenario

FIG. 24 presents another access control scenario 2400. In this case, an access request arrives at the access control enforcement point of System 2402. Authentication and access control decision-making occur at System 2401. A callout 2405 is, but need not, be attached to System 2402 to identify the location where the request initially arrives.

Within the System 2402 rounded rectangle is a small shaded callout containing the name R. This symbol identifies System 2402 as an access control enforcement point. Because System 2402 does not make access control decisions, it must send the request to the access control decision point at System 2401. A bitbucket 2406 containing R sent from System 2402 to System 2401 shows the transfer of the request. The R in a hexagon in System 2401 identifies System 2401 as an access control decision point. System 2401 decides if the request should be allowed with reference to Data 2403 and returns its decision to System 2402. A bitbucket 2408 containing R in a hexagon represents transmission of the access control decision.

At System 2401, the A authentication decision is made with reference to authentication reference data stored in Data 2403, and the results of the A authentication decision and the access control reference data and context data stored in Data 2403 are used to make the decision to allow or deny request R.

FIG. 25 presents an alternative instance diagram 2500 of the access control scenario of FIG. 24. In this diagram, the explicit access control decision point and access control enforcement point symbols are not used. The flow of access requests and decisions between System 2502 and System 2501 are also omitted. Instead, these are replaced by additional information in a access request block 2505 at System 2502.

A reference has been added to the bottom of the request block 2505. This reference, "Dec: System 2501," indicates that System 2501 is the access control decision point for this request. This reference replaces the explicit access control decision point symbol. System 2502 is, therefore, implicitly identified as the access control enforcement point. Since the access request must arrive at either an access control decision point or an access control enforcement point and the reference identifies System 2501 as the access control decision point, System 2502 must be the access control enforcement point.

An authentication decision point symbol has been added to the Role entry in the request block 2505. This indicates that the A authentication decision will be used to establish the identity associated with the request.

Since System 2501 is the A authentication decision point, this indicates that System 2501 performs the authentication associated with this request. The Privilege entry in the request block 2505 has been augmented with an access control reference data symbol and a context reference data symbol. These identify the reference data that will be used in deciding to allow or deny this request. As in FIG. 24, System 2501 in this embodiment makes the A authentication decision with reference to the authentication reference data stored in Data 2503. The results of the A authentication decision and the access control reference data and context data stored in Data 2503 are used to make the access control decision, i.e., the decision to allow or deny request R.

FIG. 27 illustrates an example computer system 2700, in which the present invention may be implemented as programmable code. Various embodiments of the invention are described in terms of this example computer system 2700. After reading this description, it will become apparent to a person skilled in the art how to implement the invention using other computer systems and/or computer architectures.

Computer system 2700 includes one or more processors, such as processor 2704. Processor 2704 may be any type of processor, including but not limited to a special purpose or a general purpose digital signal processor. Processor 2704 is connected to a communication infrastructure 2706 (for example, a bus or network). Various software implementations are described in terms of this exemplary computer system. After reading this description, it will become apparent to a person skilled in the art how to implement the invention using other computer systems and/or computer architectures.

Computer system 2700 also includes a main memory 2708, preferably random access memory (RAM), and may also include a secondary memory 2710. Secondary memory 2710 may include, for example, a hard disk drive 2712 and/or a removable storage drive 2714, representing a floppy disk drive, a magnetic tape drive, an optical disk drive, etc. Removable storage drive 2714 reads from and/or writes to a removable storage unit 2718 in a well known manner. Removable storage unit 2718 represents a floppy disk, magnetic tape, optical disk, etc., which is read by and written to by removable storage drive 2714. As will be appreciated, removable storage unit 2718 includes a computer usable storage medium having stored therein computer software and/or data.

In alternative implementations, secondary memory 2710 may include other similar means for allowing computer programs or other instructions to be loaded into computer system 2700. Such means may include, for example, a removable storage unit 2722 and an interface 2720. Examples of such means may include a program cartridge and cartridge interface (such as that found in video game devices), a removable memory chip (such as an EPROM, or PROM) and associated socket, and other removable storage units 2722 and interfaces 2720 which allow software and data to be transferred from removable storage unit 2722 to computer system 2700.

Computer system 2700 may also include a communication interface 2724. Communication interface 2724 allows software and data to be transferred between computer system 2700 and external devices. Examples of communication interface 2724 may include a modem, a network interface (such as an Ethernet card), a communication port, a Personal Computer Memory Card International Association (PCMCIA) slot and card, etc. Software and data transferred via communication interface 2724 are in the form of signals 2728 which may be electronic, electromagnetic, optical, or other signals capable of being received by communication interface 2724. These signals 2728 are provided to communication interface 2724 via a communication path 2726. Communication path 2726 carries signals 2728 and may be implemented using wire or cable, fiber optics, a phone line, a cellular phone link, a radio frequency link, or any other suitable communication channel. For instance, communication path 2726 may be implemented using a combination of channels.

In this document, the terms "computer program medium" and "computer usable medium" are used generally to refer to media such as removable storage drive 2714, a hard disk installed in hard disk drive 2712, and signals 2728. These computer program products are means for providing software to computer system 2700.

Computer programs (also called computer control logic) are stored in main memory 2708 and/or secondary memory 2710. Computer programs may also be received via communication interface 2724. Such computer programs, when executed, enable computer system 2700 to implement the present invention as discussed herein. Accordingly, such computer programs represent controllers of computer system 2700. Where the invention is implemented using software, the software may be stored in a computer program product and loaded into computer system 2700 using removable storage drive 2714, hard disk drive 2712, or communication interface 2724, to provide some examples.

While a particular form of the invention has been illustrated and described, it will be apparent that various modifications can be made without departing from the spirit and scope of the invention. Therefore, the breadth and scope of the present invention should not be limited by any of the above-described exemplary embodiments, but should be defined only in accordance with the following claims and their equivalents.

What is claimed is:

1. A method for representing security features of a distributed computing system, comprising:
   providing a specification comprising defined object types representing security-related elements of distributed systems; and
   generating, using a computer, a representation of select security features of said distributed computing system using said specification;
   wherein said generating step comprises:
      instantiating object instances using said defined object types, wherein each said object instances models a security-related element of said distributed computing system; and
      assembling said object instances according to defined operational patterns which describe security mechanisms of distributed systems, to thereby generate said representation of said select security features,
   wherein said security-related elements which may be modeled by said object instances comprise components of security mechanisms, features of an environment in which distributed systems operate, and supporting security features, wherein each said object instance models a component of a security mechanism of said distributed computing system, a feature of an environment in which said distributed computing system operates, and a supporting security feature of said distributed computing system,
   wherein the supporting security features comprise at least refinements, wherein the refinements comprise at least one of zone properties, segment properties, and segment medium types.

2. The method of claim 1, wherein the components of the security mechanisms comprise at least one of decision points, enforcement points, system entities, security relevant information, and storage.

3. The method of claim 2, wherein the decision points comprise at least one of authentication decision point, access control decision point, and audit decision point.

4. The method of claim 2, wherein the security relevant information comprises at least one of an authenticator, reference data, reference extracts, credentials, and audit records.

5. The method of claim 4, wherein an input to the authenticator includes at least one of passwords, personal identification numbers (PINs), and security tokens.

6. The method of claim 2, wherein the storage comprises data storage elements.

7. The method of claim 6, wherein the data storage elements comprise at least one of datastores, directories, shadow datastores, shadow directories, and non-persistent datastores.

8. The method of claim 1, wherein the supporting security features further comprise at least one of communication mechanisms, grouping mechanisms, key material, stored data types, transformations, and dependency relationships.

9. The method of claim 8, wherein the communication mechanisms comprise at least one of channels and segments.

10. The method of claim 8, wherein the grouping mechanisms comprise at least one of zones and clustering.

11. The method of claim 8, wherein the transformations comprise at least one of encryption, decryption, and hashing.

12. The method of claim 8, wherein the key material comprises at least one of symmetric keys and PKI keys.

13. The method of claim 1, wherein refinements comprise zone properties.

14. The method of claim 1, wherein said security mechanisms comprise at least one of access control, authentication, and auditing.

15. The method of claim 1, wherein said generating step further comprises:
    linking said object instances to graphical representations; and
    constructing an instance diagram using said graphical representations, said instance diagram depicting said select security features of said distributed computing system and of an environment in which said distributed computing system operates.

16. The method of claim 1, wherein said generating step further comprises:
    constructing, using said object instances, an instance model comprising a textual rendering that models said select security features of said distributed computing system and of an environment in which said distributed computing system operates.

17. The method of claim 16, wherein said generating step further comprises:
    generating an instance diagram using said instance model, said instance diagram depicting said select security features of said distributed computing system and of an environment in which said distributed computing system operates.

18. A computer program product comprising a non-transitory computer usable medium having control logic stored therein for causing a computer to represent security features of a distributed computing system, said control logic comprising:
    a computer readable program code configured to cause the computer to generate a representation of select security features of said distributed computing system using a specification comprising defined object types representing security-related elements of distributed systems,
    wherein said computer readable program code is configured to cause the computer to instantiate object instances using said defined object types, wherein each said object instances models a security-related element of said distributed computing system, and to assemble said object instances according to defined operational patterns which describe security mechanisms of distributed systems, to thereby generate said representation of said select security features,
    wherein said security-related elements which may be modeled by said object instances comprise components of security mechanisms, features of an environment in which distributed systems operate, and supporting security features, wherein each said object instance models a component of a security mechanism of said distributed computing system, a feature of an environment in which said distributed computing system operates, and a supporting security feature of said distributed computing system,
    wherein the supporting security features comprise at least refinements, wherein the refinements comprise at least one of zone properties, segment properties, and segment medium types.

19. A system for representing security features of a distributed computing system, comprising:
    a database having a specification comprising defined object types representing security-related elements of distributed systems;
    a processor; and
    a memory in communication with said processor and said database, said memory for storing a plurality of processing instructions for directing said processor to generate a representation of select security features of said distributed computing system using said specification,
    wherein said processor generates a representation of select security features of said distributed computing system by:
        instantiating object instances using said defined object types, wherein each said object instances models a security-related element of said distributed computing system; and
        assembling said object instances according to defined operational patterns which describe security mechanisms of distributed systems, to thereby generate said representation of said select security features,
    wherein said security-related elements which may be modeled by said object instances comprise components of security mechanisms, features of an environment in which distributed systems operate, and supporting security features, wherein each said object instance models a component of a security mechanism of said distributed computing system, a feature of an environment in which said distributed computing system operates, and a supporting security feature of said distributed computing system,
    wherein the supporting security features comprise at least refinements, wherein the refinements comprise at least one of zone properties, segment properties, and segment medium types.

* * * * *